(12) United States Patent
Tomeba et al.

(10) Patent No.: US 11,057,847 B2
(45) Date of Patent: Jul. 6, 2021

(54) BASE STATION APPARATUS, TERMINAL APPARATUS, AND COMMUNICATION METHOD FOR IMPROVING COMMUNICATION PERFORMANCE USING MULTIPLE FRAME FORMATS

(71) Applicants: SHARP KABUSHIKI KAISHA, Sakai (JP); FG INNOVATION COMPANY LIMITED, Tuen Mun (HK)

(72) Inventors: Hiromichi Tomeba, Sakai (JP); Ryota Yamada, Sakai (JP)

(73) Assignees: SHARP KABUSHIKI KAISHA, Sakai (JP); FG Innovation Company Limited, Tuen Mun (HK)

(*) Notice: Subject to any disclaimer, the term of this patent is extended or adjusted under 35 U.S.C. 154(b) by 0 days.

(21) Appl. No.: 16/313,100

(22) PCT Filed: Jun. 22, 2017

(86) PCT No.: PCT/JP2017/022959
§ 371 (c)(1),
(2) Date: Dec. 24, 2018

(87) PCT Pub. No.: WO2018/008403
PCT Pub. Date: Jan. 11, 2018

(65) Prior Publication Data
US 2019/0223118 A1    Jul. 18, 2019

(30) Foreign Application Priority Data
Jul. 5, 2016 (JP) .............................. JP2016-133247

(51) Int. Cl.
*H04W 52/36* (2009.01)
*H04W 52/20* (2009.01)
(Continued)

(52) U.S. Cl.
CPC ....... *H04W 52/367* (2013.01); *H04L 27/2602* (2013.01); *H04L 27/2607* (2013.01);
(Continued)

(58) Field of Classification Search
CPC . H04W 52/367; H04W 28/06; H04W 52/242; H04W 52/20; H04W 72/0473;
(Continued)

(56) References Cited

U.S. PATENT DOCUMENTS

2011/0105174 A1* 5/2011 Pelletier ................ H04W 52/42
455/522
2013/0128859 A1 5/2013 Takaoka et al.
(Continued)

FOREIGN PATENT DOCUMENTS

WO 2012/020540 A1 2/2012
WO 2014/180344 A1 11/2014

OTHER PUBLICATIONS

"IMT Vision—Framework and overall objectives of the future development of IMT for 2020 and beyond," Recommendation ITU-R M.2083-0, Sep. 2015.

*Primary Examiner* — Walli Z Butt
(74) *Attorney, Agent, or Firm* — ScienBiziP, P.C.

(57) ABSTRACT

Provided is a base station apparatus, a terminal apparatus, and a communication method, capable of improving communication performance such as throughput and communication efficiency in a system using a plurality of frame formats. A terminal apparatus according to the present invention, includes a reception unit to receive information indicating at least one frame structure out of a plurality of frame structures from the base station apparatus, a control unit to perform a transmit power control associated with the frame structure, and a transmission unit to generate a transmit signal based on the frame structure and the transmit (Continued)

power control and transmit the transmit signal to the base station apparatus.

17 Claims, 8 Drawing Sheets

(51) Int. Cl.
| | | |
|---|---|---|
| H04L 27/26 | (2006.01) | |
| H04W 52/24 | (2009.01) | |
| H04W 28/06 | (2009.01) | |
| H04W 24/10 | (2009.01) | |
| H04W 72/04 | (2009.01) | |
| H04W 52/26 | (2009.01) | |
| H04L 5/00 | (2006.01) | |

(52) U.S. Cl.
CPC ........... *H04W 24/10* (2013.01); *H04W 28/06* (2013.01); *H04W 52/20* (2013.01); *H04W 52/242* (2013.01); *H04W 72/0446* (2013.01); *H04W 72/0473* (2013.01); *H04L 5/0007* (2013.01); *H04W 52/262* (2013.01)

(58) Field of Classification Search
CPC ............. H04W 72/0446; H04W 24/10; H04W 52/262; H04L 27/2602; H04L 27/2607; H04L 5/0007; H04L 5/0091
See application file for complete search history.

(56) References Cited

U.S. PATENT DOCUMENTS

| | | | | |
|---|---|---|---|---|
| 2013/0281148 | A1* | 10/2013 | Seyama | H04W 52/30 455/522 |
| 2015/0282178 | A1* | 10/2015 | Kim | H04B 7/2656 370/329 |
| 2015/0382358 | A1* | 12/2015 | Wang | H04L 1/1861 370/329 |
| 2016/0066288 | A1* | 3/2016 | Feng | H04W 52/54 370/280 |

* cited by examiner

BASE STATION APPARATUS, TERMINAL APPARATUS, AND COMMUNICATION METHOD FOR IMPROVING COMMUNICATION PERFORMANCE USING MULTIPLE FRAME FORMATS

TECHNICAL FIELD

The present invention relates to a base station apparatus, a terminal apparatus, and a communication method.

BACKGROUND ART

In a communication system such as Long Term Evolution (LTE) or LTE-Advanced (LTE-A) standardized by the Third Generation Partnership Project (3GPP), the communication area can be widened by using a cellular configuration in which areas covered by base station apparatuses (base stations, transmission stations, transmission points, downlink transmission devices, uplink reception devices, a group of transmit antennas, a group of transmit antenna ports, component carriers, eNodeB, access points, AP) or transmission stations equivalent to the base station apparatuses are arranged in the form of multiple cells (Cells) being linked together. The base station apparatus is connected to terminal apparatuses (reception stations, reception points, downlink reception devices, uplink transmission devices, a group of reception antennas, a group of reception antenna ports, UE, stations, STA). In such a cellular configuration, frequency efficiency can be improved by using the same frequency among neighboring cells or sectors.

Research and development activities related to the 5th generation mobile radio communication system (5G system) are being actively carried out with the aim of starting commercial services around 2020. Recently, from the International Telecommunication Union Radio Communication Sector (ITU-R), an international standardization organization, a vision recommendation on the standard method of the 5G system (International Mobile Telecommunication-2020 and beyond (IMT-2020)) was reported (see NPL 1).

In the 5G system, in order to satisfy various requirements represented by three large use scenarios (Enhanced Mobile BroadBand (EMBB), enhanced Massive machine Type Communication (eMTC), and Ultra-Reliable and Low Latency Communication (URLLC)), it is supposed that a radio access network is operated by combining various frequency bands. Therefore, in the 5G system, unlike the conventional LTE/LTE-A, it is supposed that a frame format having different radio parameters (subcarrier intervals or the like) is multiplexed and used even though it is the same access method.

CITATION LIST

Non Patent Literature

NPL 1: "IMT Vision—Framework and overall objectives of the future development of IMT for 2020 and beyond," Recommendation ITU-R M.2083-0, September 2015.

SUMMARY OF INVENTION

Technical Problem

However, it is expected that each of a plurality of frame formats has a suitable communication scheme and a communication method. The 5G system needs to be a system that integrates these schemes and methods while maintaining communication suitable for each frame format.

The present invention has been made in view of such a circumstance, and its object is to provide a base station apparatus, a terminal apparatus, and a communication method, capable of improving communication performance such as throughput and communication efficiency in a system using a plurality of frame formats.

Solution to Problem

To address the above-mentioned drawbacks, a base station apparatus, a terminal apparatus, and a communication method according to the present invention are configured as follows.

(1) A terminal apparatus according to the present invention is a terminal apparatus that communicates with a base station apparatus, the terminal apparatus including a reception unit to receive information indicating at least one frame structure from among a plurality of frame structures from the base station apparatus, a control unit to perform transmit power control associated with the frame structure, and a transmission unit to generate a transmit signal based on the frame structure and the transmit power control and transmitting the transmit signal to the base station apparatus.

(2) In addition, the terminal apparatus according to the present invention is the terminal apparatus described in (1) above, wherein the control unit performs a transmit power control using a value set for each of the frame structure related to at least one of a maximum allowable transmit power, an allocated radio resource amount, a target received power in the base station apparatus, a propagation loss between the base station apparatus and the terminal apparatus, a coefficient for compensation of the propagation loss, a modulation scheme, and an error in the transmit power control.

(3) In addition, the terminal apparatus according to the present invention is the terminal apparatus described in (2) above, wherein a radio resource amount allocated to the terminal apparatus is set based on a predetermined radio resource unit, and the number of subcarriers included in the predetermined radio resource unit is different for each of the plurality of frame structures.

(4) In addition, the terminal apparatus according to the present invention is the terminal apparatus described in (2) above, wherein the target received power in the base station apparatus includes a transmit power control related to an antenna gain of the base station apparatus and the terminal apparatus, the transmit power control related to the antenna gain is set based on a reference antenna gain and an antenna gain of the base station apparatus and the terminal apparatus.

(5) Further, a terminal apparatus according to the present invention is a terminal apparatus described in (2) above, wherein the coefficient related to compensation of the propagation loss can be set to a value exceeding 1 in a case that the predetermined frame structure is set among the plurality of frame structures.

(6) In addition, the terminal apparatus according to the present invention is the terminal apparatus described in (2) above, wherein a propagation loss between the base station apparatus and the terminal apparatus includes a transmit power control related to an antenna gain of the base station apparatus and the terminal apparatus, the transmit power control related to the antenna gain is set based on a reference antenna gain and an antenna gain of the base station apparatus and the terminal apparatus.

(7) In addition, the terminal apparatus according to the present invention is the terminal apparatus described in (2) above, wherein the control unit further performs transmit power control related to an antenna gain of the base station apparatus and the terminal apparatus, and the transmit power control related to the antenna gain is set based on a reference antenna gain and an antenna gain of the base station apparatus and the terminal apparatus.

(8) In addition, a terminal apparatus according to the present invention is a terminal apparatus described in (1) above, wherein the control unit performs transmit power control using a value set for the predetermined frame structure in a case of a predetermined frame structure.

(9) In addition, the terminal apparatus according to the present invention is the terminal apparatus described in (2) above, wherein the control unit calculates transmit power based on at least control information notified from the base station apparatus, and the configuration cycle of the control information is set for each of the plurality of frame structures.

(10) In addition, the terminal apparatus according to the present invention is the terminal apparatus described in (2) above, wherein information indicating a difference between the maximum allowable transmit power and the transmit power of the transmit signal is notified to the base station apparatus.

(11) In addition, the terminal apparatus according to the present invention is the terminal apparatus described in (10) above, wherein a cycle of notifying the information indicating the difference to the base station apparatus is set for each of the plurality of frame structures.

(12) A base station apparatus according to the present invention is a base station apparatus that communicates with a terminal apparatus, the base station apparatus including a transmission unit that notifies an instruction for at least one of a plurality of frame structures and control information for transmit power control of the terminal apparatus, wherein the control information includes at least one of a maximum allowable transmit power of the terminal apparatus, an allocated radio resource amount of the terminal apparatus, a target received power in the base station apparatus of the terminal apparatus, a propagation loss between the base station apparatus and the terminal apparatus, a coefficient for compensation of the propagation loss, a modulation scheme, and an error in the transmit power control, and at least one information includes in the control information is set for each of the plurality of frame structures.

(13) In addition, the terminal apparatus according to the present invention is the terminal apparatus described in (12) above, wherein a cycle in which the transmission unit notifies the control information is determined based on the frame structure associated with at least a part of the information included in the control information.

(14) A communication method according to the present invention is a communication method that communicates with a base station apparatus, includes a step for receiving, from the base station apparatus, information indicating at least one frame structure from among a plurality of frame structures, a step for performing transmit power control that is associated with the frame structure, and a step for generating a transmit signal based on the frame structure and the transmit power control and transmitting the transmit signal to the base station apparatus.

Advantageous Effects of Invention

According to the present invention, it is possible to improve communication performance in a system using a plurality of frame formats.

DESCRIPTION OF EMBODIMENTS

A communication system according to the present embodiment includes a base station apparatus (a transmission unit, cells, a transmission point, a group of transmit antennas, a group of transmit antenna ports, component carriers, eNodeB) and terminal apparatuses (a terminal, a mobile terminal, a reception point, a reception terminal, a reception unit, a group of receive antennas, a group of receive antenna ports, UE). Also, a base station apparatus connecting to a terminal apparatus (establishing a wireless link) is referred to as a serving cell.

The base station apparatus and the terminal apparatus according to the present embodiment can communicate in a frequency band requiring a license (license band) and/or a frequency band not requiring license (unlicensed band).

According to the present embodiment, "X/Y" includes the meaning of "X or Y". According to the present embodiment, "X/Y" includes the meaning of "X and Y". According to the present embodiment, "X/Y" includes the meaning of "X and/or Y".

Figure 1:
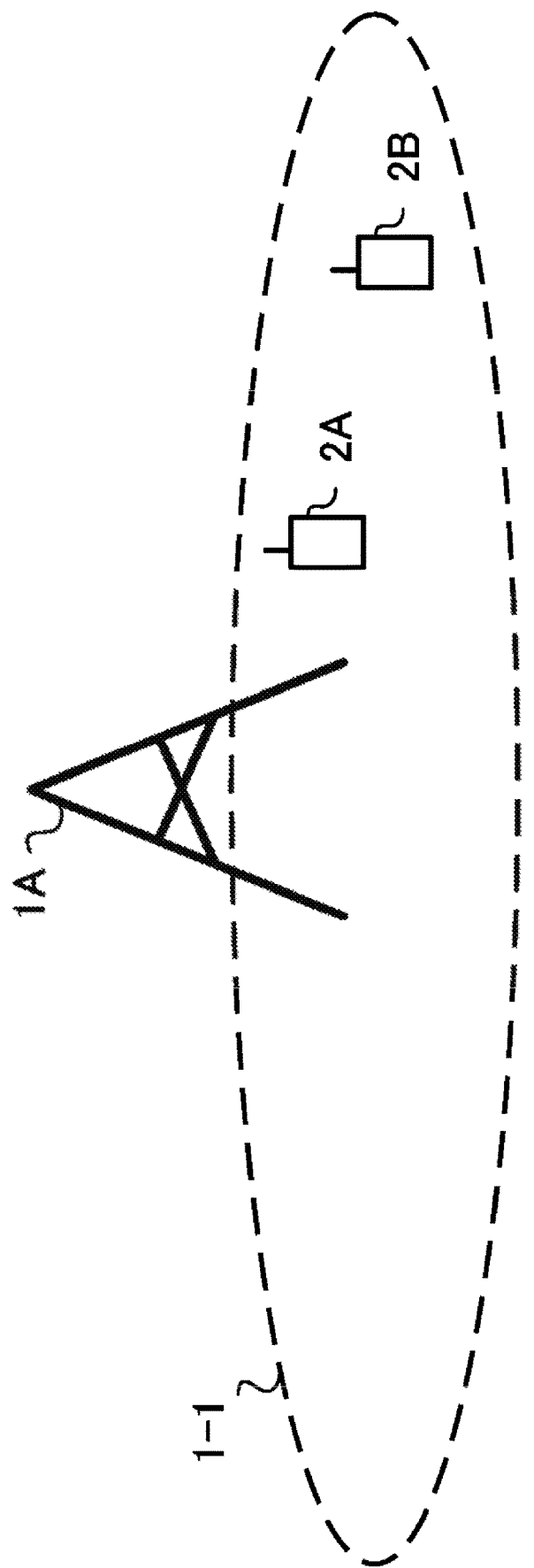
FIG. 1 is a diagram illustrating an example of a communication system according to the present embodiment.

FIG. 1 is a diagram illustrating an example of a communication system according to the present embodiment. As illustrated in FIG. 1, the communication system according to the present embodiment includes a base station apparatus 1A and terminal apparatuses 2A and 2B. Coverage 1-1 is a range (a communication area) in which the base station apparatus 1A can connect to the terminal apparatuses. The terminal apparatuses 2A and 2B are also collectively referred to as terminal apparatuses 2.

With respect to FIG. 1, the following uplink physical channels are used for uplink radio communication from the terminal apparatus 2A to the base station apparatus 1A. The uplink physical channels are used for transmitting information output from a higher layer.

Physical uplink control channel (PUCCH)
Physical uplink shared channel (PUSCH)
Physical random access channel (PRACH)

The PUCCH is used to transmit Uplink Control Information (UCI). The Uplink Control Information includes a positive ACKnowledgement (ACK) or a Negative ACKnowledgement (NACK) (ACK/NACK) for downlink data (a downlink transport block or a Downlink-Shared CHannel (DL-SCH)). ACK/NACK for the downlink data is also referred to as HARQ-ACK or HARQ feedback.

Here, the Uplink Control Information includes Channel State Information (CSI) for the downlink. The Uplink Control Information includes a Scheduling Request (SR) used to request an Uplink-Shared CHannel (UL-SCH) resource. The Channel State Information refers to a Rank Indicator (RI) specifying a suited spatial multiplexing number, a Precoding Matrix Indicator (PMI) specifying a suited precoder, a Channel Quality Indicator (CQI) specifying a suited transmission rate, a CSI-Reference Signal (RS) specifying a suited CSI-RS resource, CSI-RS Resource Indication, and the like.

The Channel Quality Indicator (hereinafter, referred to as a CQI value) can be a suited modulation scheme (e.g., QPSK, 16QAM, 64QAM, 256QAM, or the like) and a suited coding rate in a predetermined band (details of which will be described later). The CQI value can be an index (CQI Index) determined by the above change scheme, coding rate, and the like. The CQI value can take a value determined beforehand in the system.

The Rank Indicator and the Precoding Quality Indicator can take the values determined beforehand in the system. Each of the Rank Indicator, the Precoding Matrix Indicator, and the like can be an index determined by the number of spatial multiplexing, Precoding Matrix information, or the like. Note that values of the Rank Indicator, the Precoding Matrix Indicator, and the Channel Quality Indicator are collectively referred to as CSI values.

PUSCH is used for transmission of uplink data (an uplink transport block, UL-SCH). Furthermore, PUSCH may be used for transmission of ACK/NACK and/or Channel State Information along with the uplink data. In addition, PUSCH may be used to transmit the Uplink Control Information only.

PUSCH is used to transmit an RRC message. The RRC message is a signal/information that is processed in a Radio Resource Control (RRC) layer. Further, PUSCH is used to transmit a MAC Control Element (CE). Here, MAC CE is a signal/information that is processed (transmitted) in a Medium Access Control (MAC) layer.

For example, a power headroom may be included in MAC CE and may be reported via PUSCH. In other words, a MAC CE field may be used to indicate a level of the power headroom.

The PRACH is used to transmit a random access preamble.

In the uplink radio communication, an UpLink Reference Signal (UL RS) is used as an uplink physical signal. The uplink physical signal is not used for transmission of information output from higher layers, but is used by the physical layer. The Uplink Reference Signal includes a DeModulation Reference Signal (DMRS) and a Sounding Reference Signal (SRS).

The DMRS is associated with transmission of the PUSCH or the PUCCH. For example, the base station apparatus 1A uses DMRS in order to perform channel compensation of PUSCH or PUCCH. The SRS is not associated with the transmission of the PUSCH or the PUCCH. For example, the base station apparatus 1A uses SRS to measure an uplink channel state.

In FIG. 1, the following downlink physical channels are used for the downlink radio communication from the base station apparatus 1A to the terminal apparatus 2A. The downlink physical channels are used for transmitting information output from the higher layer.

Physical Broadcast CHannel (PBCH)
 Physical Control Format Indicator CHannel (PCFICH)
 Physical Hybrid automatic repeat request Indicator CHannel (PHICH)
 Physical Downlink Control CHannel (PDCCH)
 Enhanced Physical Downlink Control CHannel (EPDCCH)
 Physical Downlink Shared CHannel (PDSCH)

PBCH is used for broadcasting a Master Information Block (MIB, a Broadcast CHannel (BCH)) that is shared by the terminal apparatuses. PCFICH is used for transmitting information indicating a region used for transmission of PDCCH (for example, the number of Orthogonal Frequency Division Multiplexing (OFDM) symbols).

PHICH is used for transmission of ACK/NACK with respect to uplink data (a transport block, a codeword) received by the base station apparatus 1A. In other words, PHICH is used for transmission of a HARQ indicator (HARQ feedback) indicating ACK/NACK with respect to the uplink data. Note that ACK/NACK is also called HARQ-ACK. The terminal apparatus 2A reports ACK/NACK having been received to a higher layer. ACK/NACK refers to ACK indicating a successful reception, NACK indicating an unsuccessful reception, and DTX indicating that no corresponding data is present. In a case that PHICH for uplink data is not present, the terminal apparatus 2A reports ACK to a higher layer.

The PDCCH and the EPDCCH are used to transmit downlink control information (DCI). Here, multiple DCI formats are defined for transmission of the downlink control information. In other words, a field for the downlink control information is defined in a DCI format and is mapped to information bits.

For example, as a DCI format for the downlink, DCI format 1A to be used for the scheduling of one PDSCH in one cell (transmission of a single downlink transport block) is defined.

For example, the DCI format for the downlink includes downlink control information such as information of PDSCH resource allocation, information of a Modulation and Coding Scheme (MCS) for PDSCH, a TPC command for PUCCH, and the like. Here, the DCI format for the downlink is also referred to as downlink grant (or downlink assignment).

Furthermore, for example, as a DCI format for the uplink, DCI format 0 to be used for the scheduling of one PUSCH in one cell (transmission of a single uplink transport block) is defined.

For example, the DCI format for the uplink includes uplink control information such as information of PUSCH resource allocation, information of MCS for PUSCH, a TPC command for PUSCH, and the like. Here, the DCI format for the uplink is also referred to as uplink grant (or uplink assignment).

Further, the DCI format for uplink can be used for requesting Channel State Information (CSI, also referred to as reception quality information) for downlink (CSI request).

The DCI format for the uplink can be used for a configuration indicating an uplink resource to which a CSI feedback report is mapped, the CSI feedback report being fed back to the base station apparatus by the terminal apparatus. For example, the CSI feedback report can be used for a configuration indicating an uplink resource for periodically reporting Channel State Information (periodic CSI). The CSI feedback report can be used for a mode configuration (CSI report mode) to periodically report the Channel State Information.

For example, the CSI feedback report can be used for a configuration indicating an uplink resource to report aperiodic Channel State Information (aperiodic CSI). The CSI feedback report can be used for a mode configuration (CSI report mode) to aperiodically report the Channel State Information. The base station apparatus can configure any one of the periodic CSI feedback reports and the aperiodic CSI feedback report. In addition, the base station apparatus can configure both the periodic CSI feedback report and the aperiodic CSI feedback report.

The DCI format for the uplink can be used for a configuration indicating a type of the CSI feedback report that is fed back to the base station apparatus by the terminal apparatus. The type of the CSI feedback report includes wideband CSI (e.g., Wideband CQI), narrowband CSI (e.g., Subband CQI), and the like.

In a case where a PDSCH resource is scheduled in accordance with the downlink assignment, the terminal apparatus receives downlink data on the scheduled PDSCH. In a case where a PUSCH resource is scheduled in accordance with the uplink grant, the terminal apparatus transmits uplink data and/or uplink control information of the scheduled PUSCH.

PDSCH is used for transmission of downlink data (a downlink transport block, DL-SCH). PDSCH is used to transmit a system information block type 1 message. The system information block type 1 message is cell-specific information.

The PDSCH is used to transmit a system information message. The system information message includes a system information block X other than the system information block type 1. The system information message is cell-specific information.

PDSCH is used to transmit an RRC message. Here, the RRC message transmitted from the base station apparatus may be shared by multiple terminal apparatuses in a cell. Further, the RRC message transmitted from the base station apparatus 1A may be a dedicated message to a given terminal apparatus 2 (also referred to as dedicated signaling). In other words, user-equipment-specific information (unique to user equipment) is transmitted using a message dedicated to the given terminal apparatus. PDSCH is used for transmission of MAC CE.

Here, the RRC message and/or MAC CE is also referred to as higher layer signaling.

PDSCH can be used to request downlink channel state information. PDSCH can be used for transmission of an uplink resource to which a CSI feedback report is mapped, the CSI feedback report being fed back to the base station apparatus by the terminal apparatus. For example, the CSI feedback report can be used for a configuration indicating an uplink resource for periodically reporting Channel State Information (periodic CSI). The CSI feedback report can be used for a mode configuration (CSI report mode) to periodically report the Channel State Information.

The type of the downlink CSI feedback report includes wideband CSI (e.g., Wideband CSI) and narrowband CSI (e.g., Subband CSI). The wideband CSI calculates one piece of Channel State Information for the system band of a cell. The narrowband CSI divides the system band in predetermined units, and calculates one piece of Channel State Information for each division.

In the downlink radio communication, a Synchronization signal (SS) and a DownLink Reference Signal (DL RS) are used as downlink physical signals. The downlink physical signals are not used for transmission of information output from the higher layers, but are used by the physical layer.

The synchronization signal is used for the terminal apparatus to take synchronization in the frequency domain and the time domain in the downlink. The Downlink Reference Signal is used for the terminal apparatus to perform channel compensation on a downlink physical channel. For example, the Downlink Reference Signal is used for the terminal apparatus to calculate the downlink Channel State Information.

Here, the Downlink Reference Signals include a Cell-specific Reference Signal (CRS), a UE-specific Reference Signal (URS) or a terminal apparatus-specific reference signal relating to PDSCH, a DeModulation Reference Signal (DMRS) relating to EPDCCH, a Non-Zero Power Chanel State Information—Reference Signal (NZP CSI-RS), and a Zero Power Chanel State Information—Reference Signal (ZP CSI-RS).

CRS is transmitted in all bands of a subframe and is used to perform demodulation of PBCH/PDCCH/PHICH/PCFICH/PDSCH. URS relating to PDSCH is transmitted in a subframe and a band that are used for transmission of PDSCH to which URS relates, and is used to demodulate PDSCH to which URS relates.

DMRS relating to EPDCCH is transmitted in a subframe and a band that are used for transmission of EPDCCH to which DMRS relates. DMRS is used to demodulate EPDCCH to which DMRS relates.

A resource for NZP CSI-RS is configured by the base station apparatus 1A. The terminal apparatus 2A performs signal measurement (channel measurement), using NZP CSI-RS. A resource for ZP CSI-RS is configured by the base station apparatus 1A. With zero output, the base station apparatus 1A transmits ZP CSI-RS. The terminal apparatus 2A performs interference measurement in a resource to which NZP CSI-RS corresponds, for example.

A Multimedia Broadcast multicast service Single Frequency Network (MBSFN) RS is transmitted in all bands of the subframe used for transmitting PMCH. MBSFN RS is used to demodulate PMCH. PMCH is transmitted on the antenna port used for transmission of MBSFN RS.

Here, the downlink physical channel and the downlink physical signal are also collectively referred to as a downlink signal. The uplink physical channel and the uplink physical signal are also collectively referred to as an uplink signal. The downlink physical channels and the uplink physical channels are collectively referred to as physical channels. The downlink physical signals and the uplink physical signals are also collectively referred to as physical signals.

BCH, UL-SCH, and DL-SCH are transport channels. Channels used in the Medium Access Control (MAC) layer are referred to as transport channels. A unit of the transport channel used in the MAC layer is also referred to as a Transport Block (TB) or a MAC Protocol Data Unit (PDU). The transport block is a unit of data that the MAC layer delivers to the physical layer. In the physical layer, the transport block is mapped to a codeword, and coding processing or the like is performed for each codeword.

Also, with respect to a terminal apparatus supporting Carrier Aggregation (CA), the base station apparatus can communicate by integrating a plurality of Component Carriers (CCs) for broader broadband transmission. In carrier aggregation, one Primary Cell (PCell) and one or more Secondary Cells (SCells) are set as a set of serving cells.

In Dual Connectivity (DC), a Master Cell Group (MCG) and a Secondary Cell Group (SCG) are set as a group of serving cells. MCG consists of PCell and optionally one or more SCells. Also, the SCG consists of a Primary SCell (PSCell) and optionally one or more SCells.

The base station apparatus can communicate using a radio frame. A radio frame consists of a plurality of subframes (subsections). In a case of expressing the frame length in time, for example, the radio frame length can be set as 10 milliseconds (ms) and the subframe length can be set as 1 ms. In this example, the radio frame consists of 10 subframes. Further, a subframe length can be represented by the number of OFDM symbols since a subframe includes a plurality of OFDM symbols. For example, the subframe length can be 14 OFDM symbols. In the following description, the subframe length is described as 1 ms in a case of being represented by time, but the present invention is not limited to this. Further, the subframe may include an uplink section for communicating the uplink signal/channel, and/or a downlink section for communicating the downlink signal/channel. That is, the subframe may consist of only uplink sections, may consist of only downlink sections, or may consist of uplink sections and downlink sections. Further, the subframe may include a guard section (null section). Here, the position where the guard section can be allocated and/or the guard section length may be fixed, or may be set by the base station apparatus. Also, the section length that can be set may be varied base on whether the guard section is allocated in front of the subframe or in the backward of the subframe. Also, in the subframe including the uplink section, the downlink section, and the guard section, the section length may be fixed depending on the allocation of each section. Also, the base station apparatus can set the allocation and the section length of the uplink section/downlink section/guard section of the subframe in the higher layer, and can transmit them to the terminal apparatus being included in the control information. Also, the base station apparatus can set for each subframe or each subframe group.

A subframe includes one or more OFDM symbols. In the following embodiments, OFDM symbols represent generated ones based on Inverse Fast Fourier Transform (IFFT), and OFDM signals represent ones obtained by attaching a guard section to OFDM symbols. Also, the guard section is a zero section, CP (cyclic prefix), or the like.

A plurality of parameters may be set for generating an OFDM symbol. Parameters include subcarrier interval and/or the number of Fast Fourier Transform (FFT) points. In addition, a base parameter that is a basic parameter of a plurality of parameters is set. Parameters other than the base parameter can be obtained based on the base parameter. For example, in a case that the subcarrier interval of the base parameter is 15 kHz, the parameters other than the base parameter can be N times of 15 kHz (N is an integer or a power of 2). Parameters with fixed values such as subcarrier intervals are also referred to as parameter sets. In the following embodiments, as one example, description will be made assuming that the first parameter set has a subcarrier interval of 15 kHz and the second parameter set has a subcarrier interval of 30 kHz, but the present invention is not limited to this. Also, the number of parameters sets that the base station apparatus can set is not limited to two. Further, in the following embodiments, the number of FFT points of the first parameter set and the second parameter set is the same unless otherwise specified. In other words, the OFDM symbol length becomes shorter as the subcarrier interval becomes wider. The OFDM symbols generated by the first parameter set and the second parameter set are also referred to as a first OFDM symbol and a second OFDM symbol, respectively. Also, a plural types of CP lengths may be set. Further, a plurality types of CP lengths may be set for each parameter set. Here, a case that two types of CP lengths are set will be described. Also, the two types of CP are also referred to as a first CP and a second CP, respectively. In the same parameter set, the second CP length is longer than the first CP length. Further, the ratio of the first CP length and the second CP length relative to OFDM symbols between each parameter set can be set to be comparable. Also, the first CP is referred to as normal CP and the second CP is referred to as extended CP. Also, OFDM signals obtained by attaching the first CP and the second CP to the first OFDM symbol are also referred to as a first OFDM signal-1 and a first OFDM signal-2, respectively. Also, OFDM signals obtained by attaching the first CP and the second CP to the second OFDM symbol are also referred to as a second OFDM signal-1 and a second OFDM signal-2, respectively.

The parameter set supported by the terminal apparatus is reported to the base station apparatus as a function (capability) of the terminal apparatus or a category of the terminal apparatus.

Figure 2:
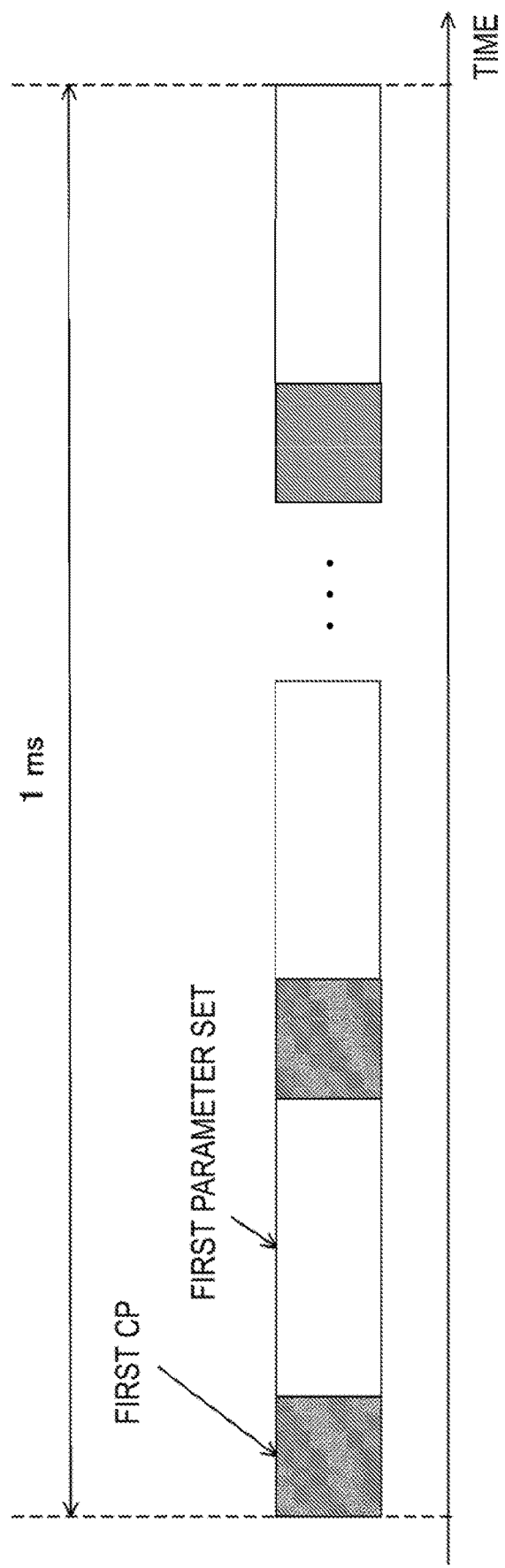
FIG. 2 is a diagram illustrating an example of a frame structure according to the present embodiment.
Figure 3:
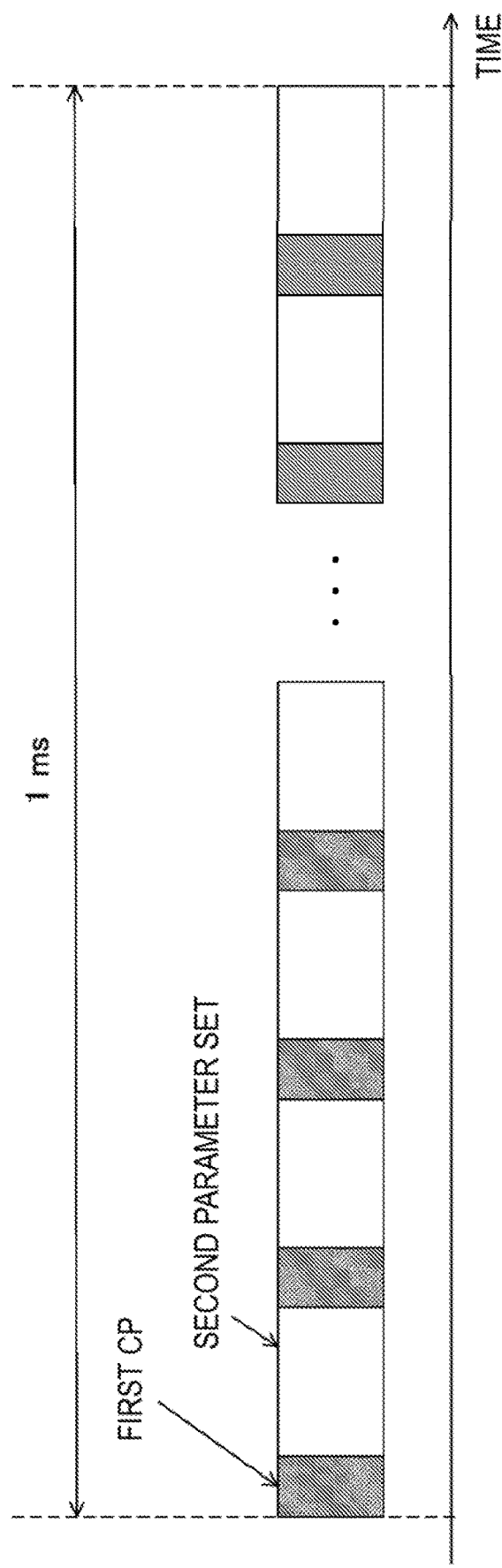
FIG. 3 is a diagram illustrating an example of a frame structure according to the present embodiment.
Figure 4:
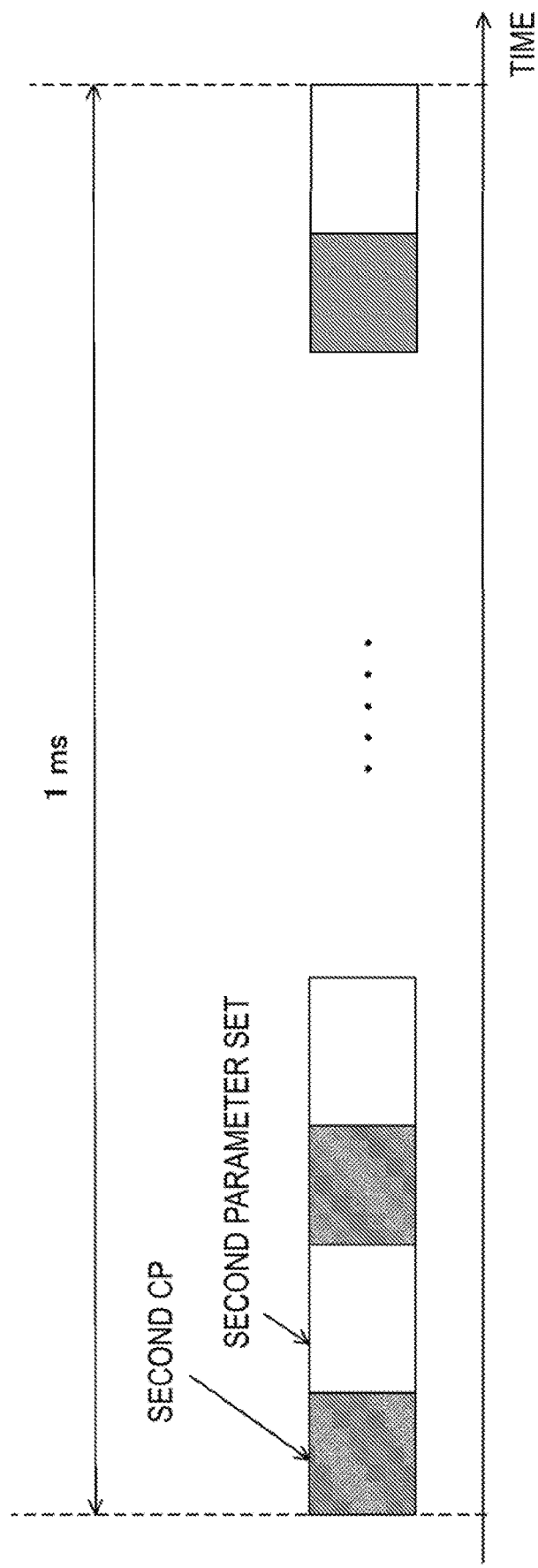
FIG. 4 is a diagram illustrating an example of a frame structure according to the present embodiment.

FIGS. 2 to 6 are examples of a subframe structure. FIG. 2 is a diagram illustrating an example of a subframe configured by the first OFDM signal-1. FIG. 3 is a diagram illustrating an example of a subframe configured by the second OFDM signal-1. Since the first parameter set has a subcarrier interval of 15 kHz and the second parameter set has a subcarrier interval of 30 kHz, the length of the second OFDM signal-1 is half the length of the first OFDM-1. Accordingly, in a case that 14 first OFDM signals-1 are included in 1 ms, 28 second OFDM signals-1 are included in 1 ms. FIG. 4 is a diagram illustrating an example of a subframe configured by the second OFDM signal-2. In the same carrier frequency (band), it is considered that the propagation environment such as multipath delay is comparable regardless of the parameters. Accordingly, it is desirable that the required CP length is determined for each carrier frequency (band). In this case, the base station apparatus transmits the OFDM signal with a suitable CP length for each carrier frequency (band). In other words, the terminal apparatus performs reception processing assuming the CP length determined by the carrier frequency (band).

Figure 5:
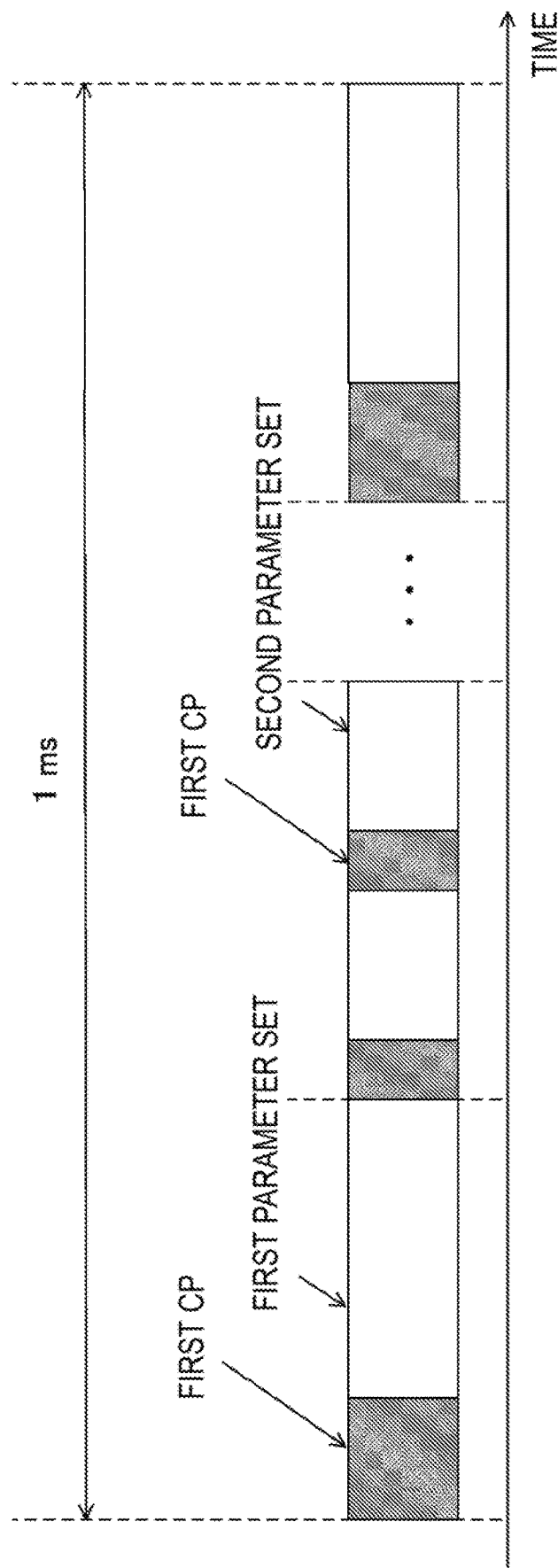
FIG. 5 is a diagram illustrating an example of a frame structure according to the present embodiment.

Further, FIG. 5 illustrates an example in which the first OFDM signal-1 and the second OFDM signal-2 are multiplexed within 1 ms. Since the length of the second OFDM signal-1 is half the length of the first OFDM-1, the section of the first OFDM signal-1 includes two second OFDM signals-2. Accordingly, the base station apparatus can select whether to allocate the first OFDM signal-1 or two second OFDM signals-1 for each section of the first OFDM signal-1. In the example of FIG. 5, two second OFDM signals-1 are allocated in the section of the second first OFDM signal-1. The CP length may slightly change for each of OFDM signals. For example, in Long Term Evolution (LTE), 14 first OFDM signals-1 are included within a subframe at a subcarrier interval of 15 kHz. Among the 14 first OFDM signals-1, the CP length attached to the first OFDM signal and the eighth OFDM signal is different from the CP length attached to the remaining OFDM signals. In a case that the subcarrier interval reaches 30 kHz with the same parameter as LTE, the CP lengths attached to the first, eighth, 15th, and 22th second OFDM signals-1 among the 28 second OFDM signals-1 and the CP lengths attached to the remaining second OFDM signals-1 are different. In this case, the section of the first OFDM signal-1 including two second OFDM signals is limited. Accordingly, in a case that the subcarrier interval is 30 kHz, the CP lengths attached to the first, second, 15th, and 16th second OFDM signals-1 among the 28 second OFDM signals-1 and the CP lengths attached to the remaining second OFDM signals-1 are made different. By doing so, two second OFDM signals-1 are included in each of the sections of the 14 first OFDM signals-1, so that the flexibility is improved.

The terminal apparatus performs time/frequency synchronization using the synchronization signal/discovery signal, and performs a cell search for detecting a physical cell identifier (PCID, cell ID, system ID) and/or a beam search for detecting a beam identifier (beam ID, beam cell ID). The cell ID may include the beam ID. Also, in order to distinguish from the cell ID that does not include the beam ID, the cell ID that includes the beam ID is also referred to as extended cell ID. Also, the discovery signal includes part or all of a synchronization signal, a cell-specific reference signal, and a CSI-RS. In a case that the synchronization signal is generated based on the cell ID and the beam ID, the terminal apparatus can know the cell ID and the beam ID from the synchronization signal sequence. Further, in a case that the base station apparatus changes the beam pattern based on the radio resource such as the subframe in which the synchronization signal is allocated, the synchronization signal is generated based on the cell ID and the information of the radio resource. The information of the radio resource is, for example, a subframe number or a subband number.

Also, the synchronization signal may be one type or a plurality of types. In a case that there are two types of synchronization signals, Primary Synchronization Signal (PSS) and Secondary Synchronization Signal (SSS), it is only necessary to know the cell ID and/or beam ID using both PSS and SSS. Also, functions may be divided for each type. For example, it is possible to identify the cell ID by PSS and to identify the beam ID by SSS. In yet another example, it is possible to identify the cell ID by PSS and SSS, and to identify the beam ID by another synchronization signal.

In a case that the base station apparatus supports data communication with the first parameter set and the second parameter set at the same carrier frequency (band), the base station apparatus can transmit the synchronization signal/discovery signal with the first parameter and/or the second parameter. That is, the base station apparatus can transmit the synchronization signal/discovery signal with a parameter determined for each carrier frequency/band. In this case, the terminal apparatus receives a synchronization signal/discovery signal of a parameter determined for each carrier frequency/band and performs cell search. Further, the base station apparatus can transmit a synchronization signal/discovery signal with a plurality of parameters at a certain carrier frequency/band. In this case, the terminal apparatus receives the synchronization signal/discovery signal of a plurality of parameters to performs cell search. Alternatively, for example, in a case that the parameters are already determined for each service, a cell search is performed by receiving the synchronization signal/discovery signal of the parameter desired by the terminal apparatus.

The base station apparatus can set a common signal section in a certain subframe. The common signal section length can be set by the number of OFDM symbols and time. In the common signal section, part or all of the cell-specific reference signal, the CSI-RS, and the synchronization signal is transmitted. In a case of the same common signal section length, the number of symbols included in the common signal section varies in a different parameter set. For example, in a case of a common signal section length including two first OFDM signals-1, four second OFDM signals-1 are included in the same common signal section length. Accordingly, in a case of transmitting the synchronization signal in the common signal section, the second OFDM signal-1 can transmit more synchronization signals than the first OFDM signal-1, so that synchronization accuracy can be improved. Otherwise in terms of cell search, the second OFDM signal-1 can transmit the synchronization signal more repeatedly, so that the coverage can be expanded while maintaining the synchronization accuracy. The common signal section may have a fixed length.

Figure 6:
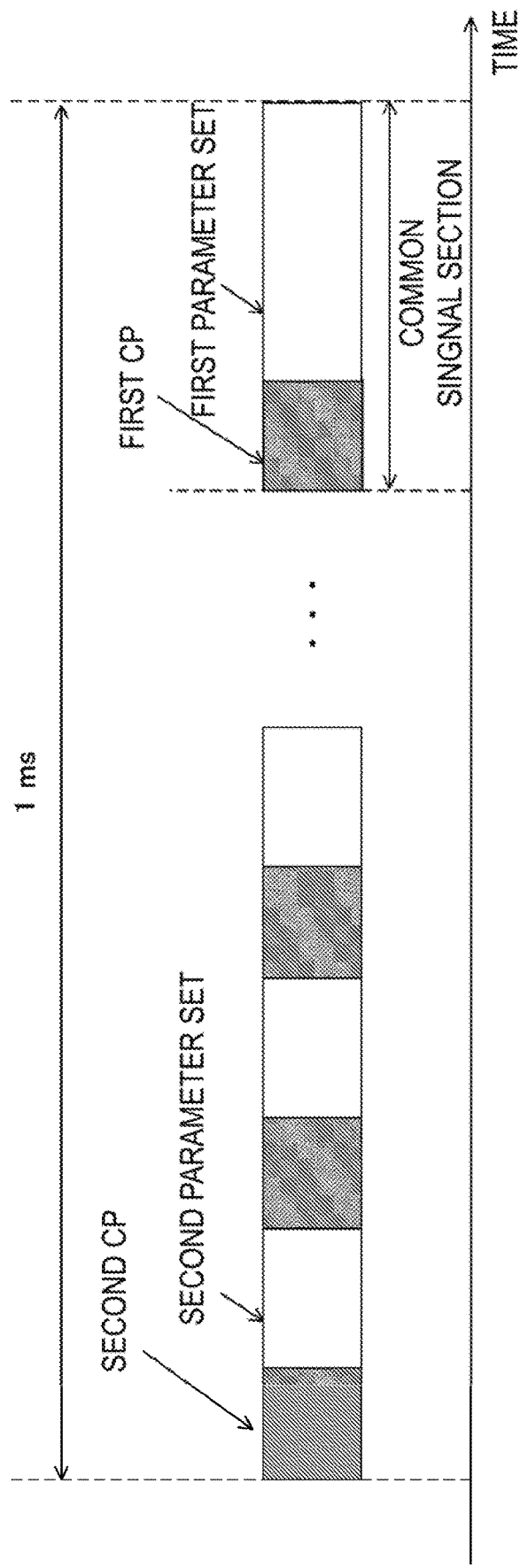
FIG. 6 is a diagram illustrating an example of a frame structure according to the present embodiment.

Further, in a case that the base station apparatus transmits a data signal with another parameter (for example, a second parameter set) in a case of transmitting a synchronization signal/discovery signal with a parameter (for example, a first parameter set) determined in a certain carrier frequency, the data signal can be transmitted in the first parameter set and the synchronization signal/discovery signal can be transmitted in the second parameter set. In this case, the terminal apparatus synchronizes with the base station apparatus by the synchronization signal/discovery signal of the second parameter set and demodulates the data signal with the first parameter set. FIG. 6 is a diagram illustrating an example of a subframe structure in a case that a data signal is transmitted using a second parameter set and a synchronization signal is transmitted using a first parameter set. In the example of FIG. 6, a common signal section, which is a common signal section in a cell, is set within 1 ms. The signals transmitted in the common signal section may be the same signal sequence in the cell or a different signal sequence for each terminal apparatus. Further, the common signal section length may be fixed or may be set by the base station apparatus. Different parameters can be used for the primary synchronization signal and the secondary synchronization signal. For example, the base station apparatus can transmit a primary synchronization signal with intra-cell common parameters (a first parameter set in the example of FIG. 6) and the secondary synchronization signal with the same parameters as the data signal (a second parameter set in the example of FIG. 6). The synchronization signal of the intra-cell common parameter is also referred to as a cell specific synchronization signal, and the synchronization signal of the terminal specific parameter is also referred to as a UE specific synchronization signal. Also, the common signal section may be set by the subframe in which the synchronization signal is transmitted. For example, in a case that the synchronization signal is transmitted every 5 ms, the common signal section is also set every 5 ms. The discovery signal can include a cell-specific synchronization signal.

Further, the base station apparatus can frequency-multiplex a plurality of parameter sets. For example, in a certain subframe, the base station apparatus can use the first parameter set in a certain subband within the system band and the second parameter set in another subband. In other words, signals having a different subcarrier interval within the system band are multiplexed. In a case that the power spectral density within the system band is kept constant, the signal power per subcarrier of the first parameter set is smaller than the signal power per subcarrier of the second parameter set. In other words, in a case that the number of subcarriers allocated by the transmit signal of the first parameter set and the transmit signal of the second parameter set is the same, the transmit power of the first parameter set becomes smaller than the transmit power of the second parameter set. In this case, the terminal apparatus can obtain the received power of the second parameter set to demodulate with reference to the received power of the first parameter set. In order to adjust the synchronization accuracy of each parameter set, it is desirable that the transmit power of the first parameter set and the transmit power of the second parameter set are made to the same degree for the synchronization signal. For example, the number of subcarriers of the synchronization signal of the first parameter set in the same system band is twice the number of subcarriers of the synchronization signal of the second parameter set. Or, the number of subcarriers of the synchronization signal of the first parameter set is the same as the number of subcarriers of the synchronization signal of the second parameter set, and the signal power per subcarrier is the same. Further, in a case that the base station apparatus transmits a common reference signal with the first parameter set and the second parameter set, the terminal apparatus can know the transmit power specific to the parameter set of the data signal/reference signal of the different parameter set based on the transmit power of this reference signal.

Also, the subframe structure may vary depending on whether or not it is an anchor cell such as a macrocell. For example, the base station apparatus can transmit a subframe in which a common signal section is set in PCell, but a subframe in which a common signal section is set in SCell does not have to be transmitted necessarily. In other words, the configuration related to the common signal section is different between PCell and SCell, and the base station apparatus may not set the common signal section at SCell. Also, the base station apparatus can change the number of parameter sets for each cell of the same band. For example, the base station apparatus can transmit signals of one parameter set in the PCell, and can transmit signals of a plurality of parameter sets in the SCell. Further, the base station apparatus can transmit with a common parameter set for each CC. In this case, the terminal apparatus communicates with SCell using the parameter set by PCell.

Also, the base station apparatus can know the preferable CSI by CSI report from the terminal apparatus. The CSI reported by the terminal apparatus includes CQI/PMI/RI/CRI/PSI. Parameter Set Indication (PSI) is an index indicating a suitable one among a plurality of parameter sets. CSI is calculated from a cell-specific reference signal and CSI-RS. The CSI-RS can transmit (set) CSI-RS that is not beamformed (non-precoded CSI-RS) and/or CSI-RS that is beamformed (beamformed CSI-RS). Also, the base station apparatus can include information of non-precoded CSI-RS or information of beamformed CSI-RS in CSI-RS configuration information. The information of the non-precoded CSI-RS includes part or all of information related to Code-Book Subset Restriction (CBSR), information on a code book, and Interference measurement restriction that is the configuration of whether or not to restrict resources in a case of measuring interference. The information of the beamformed CSI-RS includes part or all of the ID list of the CSI-RS configuration, the ID list of the CSI-Interference Measurement (CSI-IM) configuration, the information related to the codebook subset restriction, the channel measurement restriction that is the configuration as to whether or not to restrict resources in a case of channel measurement. The ID list of the CSI-IM configuration consists of ID information of one or more CSI-IM configuration, and the ID information of the CSI-IM configuration includes part or all of the CSI-IM configuration ID and the interference measurement restriction. CSI-IM is also used for interference measurement.

The base station apparatus can include configuration (CSI process) related to the procedure of calculating channel state information by associating at least CSI-RS for channel measurement and CSI-IM for interference measurement with the signaling of the higher layer. The CSI process can include part or all of its CSI process ID, information on non-precoded CSI-RS, and information on beamformed CSI-RS. The base station apparatus can set one or more CSI processes. The base station apparatus can independently generate CSI feedback for each of the CSI processes. The base station apparatus can set CSI-RS resource and CSI-IM differently for each of the CSI processes. The terminal apparatus is set with one or more CSI processes and independently reports CSI report for each of set CSI processes. Also, CSI process is set in a predetermined transmission mode.

For example, since inter-carrier interference occurs in a case of moving at high speed, a wider subcarrier interval is preferable than in a case of moving at low speed. Therefore, the base station apparatus can transmit the CSI-RS configuration for CSI report for each parameter set. At this time, the terminal apparatus can calculate the CSI for each parameter set and report it to the base station apparatus. Also, the base station apparatus can include a configuration of a parameter set in one CSI-RS configuration. In this case, the terminal apparatus selects a suitable parameter set from a plurality of parameter sets and reports PSI. The base station apparatus can allocate the CSI-RS of a parameter set different from the data transmission in the common signal section. Also, the terminal apparatus can transmit a scheduling request or a communication request with a parameter set different from the data transmission to the base station apparatus. At this time, the base station apparatus transmits CSI-RSs with different parameter sets according to a request from the terminal apparatus.

As described above, there is a possibility that the base station apparatus transmits signals of a plurality of parameter sets at a certain carrier frequency. In a case that neighbor cells also support a plurality of parameter sets, the terminal apparatus may receive signals of different parameter sets as neighbor cell interference. The terminal equipment can cancel or suppress neighbor cell interference to reduce neighbor cell interference. In a case that the terminal apparatus has a function of canceling or suppressing the neighbor cell interference, the base station apparatus can transmit the assist information (neighbor cell information) for canceling or suppressing the neighbor cell interference. The assist information includes part or all of physical cell ID, the number of CRS port, $P_A$ list, $P_B$, Multimedia Broadcast multicast service Single Frequency Network (MBSFN) subframe structure, transmission mode list, resource allocation granularity, subframe structure, ZP/NZP CSI-RS configuration, Quasi Co-Location (QCL) information, frame format, supported parameter set, parameter set for each subframe, CP length, FFT size, system band, whether it is LTE or not. $P_A$ is a power ratio (power offset) of PDSCH and CRS in an OFDM symbol where CRS is not allocated. $P_B$ represents a power ratio (power offset) of PDSCH in an OFDM symbol where CRS is allocated and PDSCH in an OFDM symbol where CRS is not allocated. The subframe structure is information indicating whether the subframe is uplink, downlink, or uplink and downlink. The QCL information is information relating to QCL with respect to a predetermined antenna port, a predetermined signal, or a predetermined channel. In the two antenna ports, in a case that long term performance of the channel carrying symbols on one antenna port can be inferred from the channel carrying symbols on the other antenna port, those antenna ports are referred to as QCL. Long term performance includes delay spread, doppler spread, doppler shift, and average gain and/or average delay. That is, in a case that the two antenna ports are QCL, the terminal apparatus can be regarded as having the same long term performance at those antenna ports. In each of the parameters included in the above-mentioned assist information, one value (candidate) may be configured, or multiple values (candidates) may be configured. In a case that a plurality of values is set, the terminal apparatus interprets that the possible value to be set by the interference base station apparatus is being indicated for that parameter, and detects (identify) a parameter set in the interference signal among a plurality of values. Also, the above-mentioned assist information can cancel or suppress part or all of the reference signal, PDSCH, (E)PDCCH transmitted from the neighbor cell. In addition, the above-mentioned assist information may be used in a case that various types of measurement are carried out. The stated measurement includes Radio Resource Management (RRM) measurement, Radio Link Monitoring (RLM) measurement, Channel State Information (CSI) measurement.

In a case that the terminal apparatus determines that the neighbor cell interference is LTE, the interference signal can be canceled or suppressed using the assist information. Further, in a case that the configuration information of the subframe being transmitted by the serving cell and the configuration information of the subframe being transmitted by the neighbor cell interference are the same, the terminal apparatus can remove or suppress the interference signal using the assist information. For example, if the configuration information of subframes are the same it means that that the subframes of the serving cell and the neighbor cell are downlink, and/or the parameter sets are the same, and/or the CP lengths are the same. Further, in a case that the configuration information of the subframe being transmitted by the serving cell and the configuration information of the subframe being transmitted by the neighbor cell are different, the terminal apparatus does not remove the neighbor cell interference using the assist information, but suppress the interference by the linear method. For example, such cases include a case that the neighbor cell is transmitting the uplink subframe, a case that the parameter set is different, or a case that the CP length is different. Further, in a case that there is a possibility of communication with a parameter set different from the parameter set being used by the neighboring cell for communicating with the serving cell, the terminal apparatus does not remove the neighbor cell interference using the assist information, but suppress the interference by the linear method. For example, a case that the neighbor cell supports a plurality of parameter sets, and/or the terminal apparatus does not use the assist information to cancel neighbor cell interference. Also, for example, in a case that the neighbor cell support one parameter set and communicate with a different parameter set from the serving cell, the terminal apparatus does not use the assist information to cancel neighbor cell interference.

The communication system according to the present embodiment can be provided with a System Frame Number (SFN) for frame synchronization between the base station apparatus and the terminal apparatus and between the terminal apparatuses connected to the base station apparatus. The SFN may be a serial number of a frame transmitted by the base station apparatus or the terminal apparatus. The communication system according to the present embodiment can count SFN with a fixed time length as a unit, independent of the frame structure set by the base station apparatus (or the radio parameter defining the frame structure, or the base parameter or parameter set determining the parameter of the radio frame). That is, since the SFN are receiving same subframes in the terminal apparatuses having a different frame structure set by the base station apparatus, the transmission in which the receiving subframe number (or the number of received subframes and the number of OFDM symbols) is different is possible in the base station apparatus according to the present embodiment.

Figure 7:
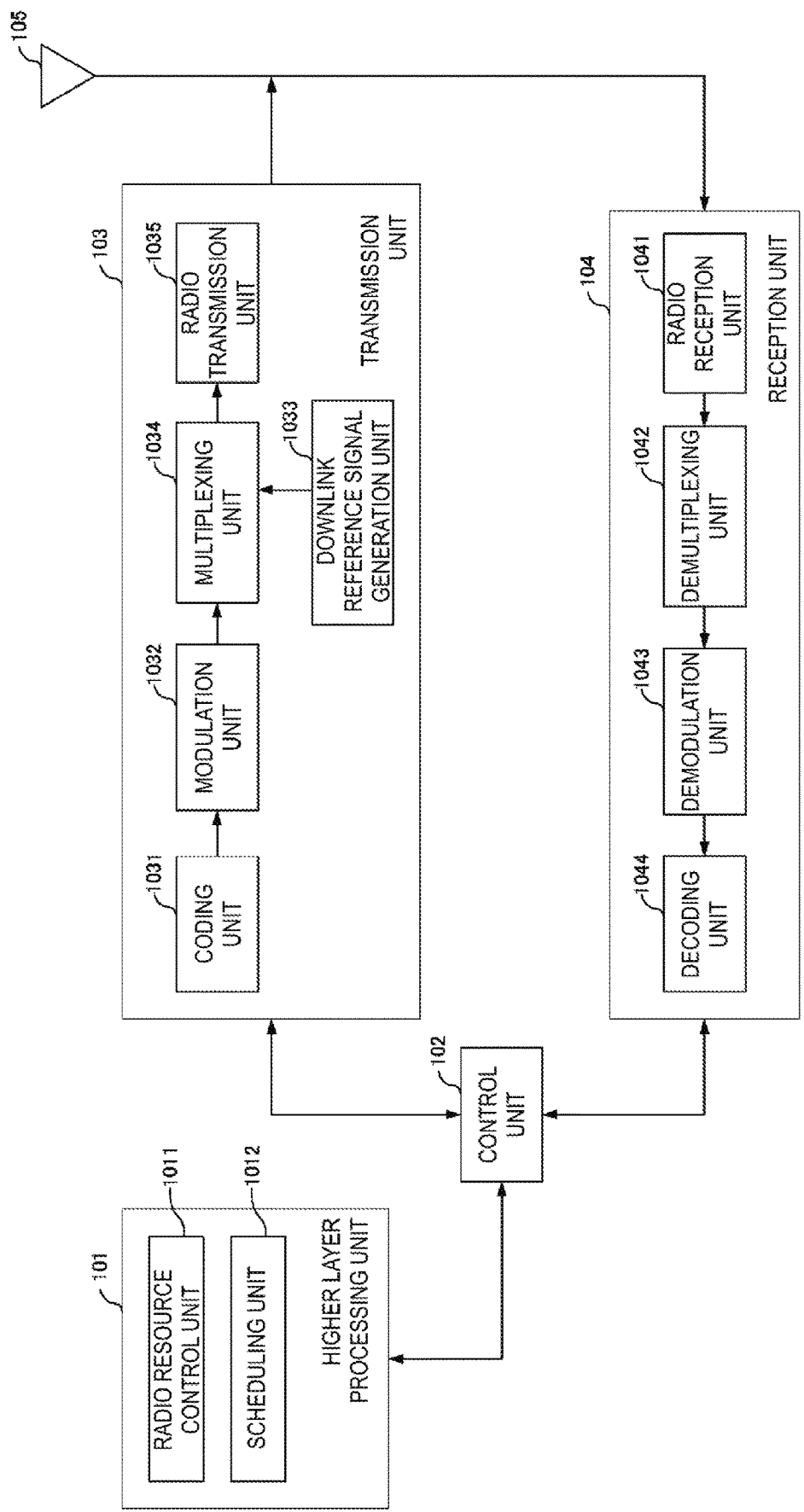
FIG. 7 is a block diagram illustrating a configuration example of a base station apparatus according to the present embodiment.

FIG. 7 is a schematic block diagram illustrating a configuration of the base station apparatus 1A according to the present embodiment. As illustrated in FIG. 7, the base station apparatus 1A is configured, including a higher layer processing unit (higher layer processing step) 101, a control unit (controlling step) 102, a transmission unit (transmitting step) 103, a reception unit (receiving step) 104, and a transmit and/or receive antenna 105. The higher layer processing unit 101 is configured, including a radio resource control unit (radio resource controlling step) 1011 and a scheduling unit (scheduling step) 1012. The transmission unit 103 is configured, including a coding unit (coding step) 1031, a modulation unit (modulating step) 1032, a downlink reference signal generation unit (downlink reference signal generating step) 1033, a multiplexing unit (multiplexing step) 1034, and a radio transmission unit (radio transmitting step) 1035. The reception unit 104 is configured, including a radio reception unit (radio receiving step) 1041, a demultiplexing unit (demultiplexing step) 1042, a demodulation unit (demodulating step) 1043, and a decoding unit (decoding step) 1044.

The higher layer processing unit 101 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 101 generates information necessary for control of the transmission unit 103 and the reception unit 104, and outputs the generated information to the control unit 102.

The higher layer processing unit 101 receives information of a terminal apparatus, such as UE capability or the like, from the terminal apparatus. To rephrase, the terminal apparatus transmits its function to the base station apparatus by higher layer signaling.

Note that in the following description, information of a terminal apparatus includes information indicating whether the stated terminal apparatus supports a prescribed function, or information indicating that the stated terminal apparatus has completed the introduction and test of a prescribed function. In the following description, information of whether the prescribed function is supported includes information of whether the introduction and test of the prescribed function have been completed.

For example, in a case where a terminal apparatus supports a prescribed function, the stated terminal apparatus transmits information (parameters) indicating whether the prescribed function is supported. In a case where a terminal apparatus does not support a prescribed function, the stated terminal apparatus does not transmit information (parameters) indicating whether the prescribed function is supported. In other words, whether the prescribed function is supported is reported by whether information (parameters) indicating whether the prescribed function is supported is transmitted. Information (parameters) indicating whether a prescribed function is supported may be reported using one bit of 1 or 0.

The radio resource control unit 1011 generates, or acquires from a higher node, the downlink data (the transport block) arranged in the downlink PDSCH, system information, the RRC message, the MAC Control Element (CE), and the like. The radio resource control unit 1011 outputs the downlink data to the transmission unit 103, and outputs other information to the control unit 102. Furthermore, the radio resource control unit 1011 manages various configuration information of the terminal apparatuses.

The scheduling unit 1012 determines a frequency and a subframe to which the physical channels (PDSCH and PUSCH) are allocated, the coding rate and modulation scheme (or MCS) for the physical channels (PDSCH and PUSCH), the transmit power, and the like. The scheduling unit 1012 outputs the determined information to the control unit 102.

The scheduling unit 1012 generates the information to be used for the scheduling of the physical channels (PDSCH and PUSCH), based on the result of the scheduling. The scheduling unit 1012 outputs the generated information to the control unit 102.

Based on the information input from the higher layer processing unit 101, the control unit 102 generates a control signal for controlling of the transmission unit 103 and the reception unit 104. The control unit 102 generates the downlink control information based on the information input from the higher layer processing unit 101, and outputs the generated information to the transmission unit 103.

The transmission unit 103 generates the downlink reference signal in accordance with the control signal input from the control unit 102, codes and modulates the HARQ indicator, the downlink control information, and the downlink data that are input from the higher layer processing unit 101, multiplexes PHICH, PDCCH, EPDCCH, PDSCH, and the downlink reference signal, and transmits a signal obtained through the multiplexing to the terminal apparatus 2 through the transmit and/or receive antenna 105.

The coding unit 1031 codes the HARQ indicator, the downlink control information, and the downlink data that are input from the higher layer processing unit 101, in compliance with the coding scheme prescribed in advance, such as block coding, convolutional coding, or turbo coding, or in compliance with the coding scheme determined by the radio resource control unit 1011. The modulation unit 1032 modulates the coded bits input from the coding unit 1031, in compliance with the modulation scheme prescribed in advance, such as Binary Phase Shift Keying (BPSK), Quadrature Phase Shift Keying (QPSK), quadrature amplitude modulation (16QAM), 64QAM, or 256QAM, or in compliance with the modulation scheme determined by the radio resource control unit 1011.

The downlink reference signal generation unit 1033 generates, as the downlink reference signal, a sequence that is already known to the terminal apparatus 2A and that is acquired in accordance with a rule prescribed in advance based on the physical cell identity (PCI, cell ID) for identifying the base station apparatus 1A, and the like.

The multiplexing unit 1034 multiplexes the modulated modulation symbol of each channel, the generated downlink reference signal, and the downlink control information. To be more specific, the multiplexing unit 1034 maps the modulated modulation symbol of each channel, the generated downlink reference signal, and the downlink control information to the resource elements.

The radio transmission unit 1035 performs Inverse Fast Fourier Transform (IFFT) on the modulation symbol resulting from the multiplexing or the like, generates an OFDM symbol, attaches a Cyclic Prefix (CP) to the generated OFDM symbol, generates a baseband digital signal, converts the baseband digital signal into an analog signal, removes unnecessary frequency components through filtering, up-converts a result of the removal into a signal of a carrier frequency, performs power amplification, and outputs a final result to the transmit and/or receive antenna 105 for transmission.

In accordance with the control signal input from the control unit 102, the reception unit 104 demultiplexes, demodulates, and decodes the reception signal received from the terminal apparatus 2A through the transmit and/or receive antenna 105, and outputs information resulting from the decoding to the higher layer processing unit 101.

The radio reception unit 1041 converts, by down-converting, an uplink signal received through the transmit and/or receive antenna 105 into a baseband signal, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio reception unit 1041 removes a portion corresponding to CP from the digital signal resulting from the conversion. The radio reception unit 1041 performs Fast Fourier Transform (FFT) on the signal from which CP has been removed, extracts a signal in the frequency domain, and outputs the resulting signal to the demultiplexing unit 1042.

The demultiplexing unit 1042 demultiplexes the signal input from the radio reception unit 1041 into PUCCH, PUSCH, and the signal such as the uplink reference signal. The demultiplexing is performed based on radio resource allocation information that is determined in advance by the base station apparatus 1A using the radio resource control unit 1011 and that is included in the uplink grant notified to each of the terminal apparatuses 2.

Furthermore, the demultiplexing unit 1042 makes a compensation of channels including PUCCH and PUSCH. The demultiplexing unit 1042 demultiplexes the uplink reference signal.

The demodulation unit 1043 performs Inverse Discrete Fourier Transform (IDFT) on PUSCH, acquires modulation symbols, and performs reception signal demodulation, that is, demodulates each of the modulation symbols of PUCCH and PUSCH, in compliance with the modulation scheme prescribed in advance, such as BPSK, QPSK, 16QAM, 64QAM, 256QAM, or the like, or in compliance with the modulation scheme that the base station apparatus 1A itself notified in advance, with the uplink grant, each of the terminal apparatuses 2.

The decoding unit 1044 decodes the coded bits of PUCCH and PUSCH, which have been demodulated, at the coding rate in compliance with a coding scheme prescribed in advance, the coding rate being prescribed in advance or being notified in advance with the uplink grant to the terminal apparatus 2 by the base station apparatus 1A itself, and outputs the decoded uplink data and uplink control information to the higher layer processing unit 101. In a case where PUSCH is re-transmitted, the decoding unit 1044 performs the decoding with the coded bits input from the higher layer processing unit 101 and retained in an HARQ buffer, and the demodulated coded bits.

Figure 8:
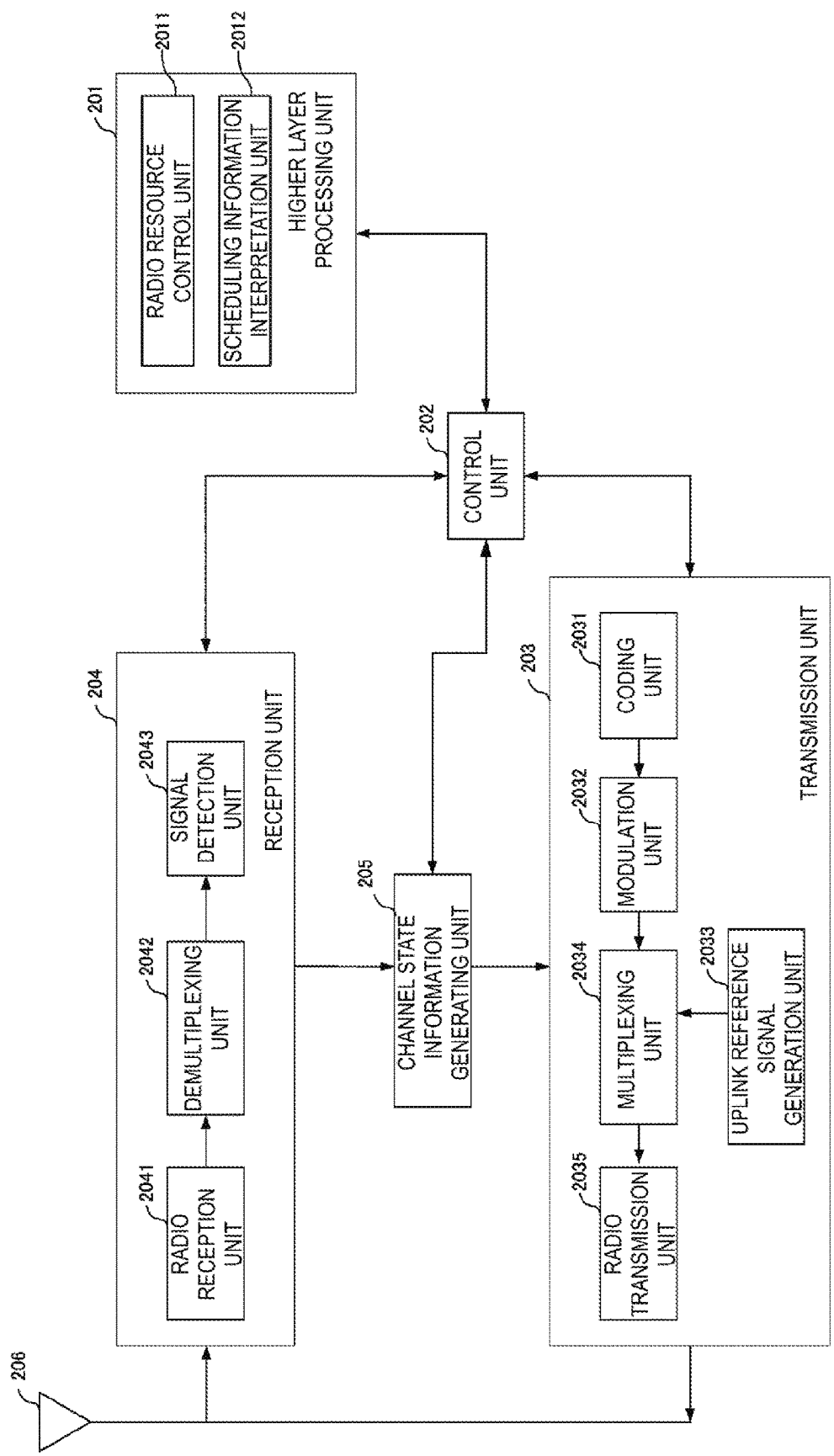
FIG. 8 is a block diagram illustrating a configuration example of a terminal apparatus according to the present embodiment.

FIG. 8 is a schematic block diagram illustrating a configuration of the terminal apparatus 2 according to the present embodiment. As illustrated in FIG. 7, the terminal apparatus 2A is configured, including a higher layer processing unit (higher layer processing step) 201, a control unit (controlling step) 202, a transmission unit (transmitting step) 203, a reception unit (receiving step) 204, a channel state information generating unit (channel state information generating step) 205, and a transmit and/or receive antenna 206. The higher layer processing unit 201 is configured, including a radio resource control unit (radio resource controlling stop) 2011 and a scheduling information interpretation unit (scheduling information interpreting step) 2012. The transmission unit 203 is configured, including a coding unit (coding step) 2031, a modulation unit (modulating step) 2032, an uplink reference signal generation unit (uplink reference signal generating step) 2033, a multiplexing unit (multiplexing step) 2034, and a radio transmission unit (radio transmitting step) 2035. The reception unit 204 is configured, including a radio reception unit (radio receiving step) 2041, a demultiplexing unit (demultiplexing step) 2042, and a signal detection unit (signal detecting step) 2043.

The higher layer processing unit 201 outputs the uplink data (the transport block) generated by a user operation or the like, to the transmission unit 203. The higher layer processing unit 201 performs processing of the Medium Access Control (MAC) layer, the Packet Data Convergence Protocol (PDCP) layer, the Radio Link Control (RLC) layer, and the Radio Resource Control (RRC) layer.

The higher layer processing unit 201 outputs, to the transmission unit 203, information indicating a terminal apparatus function supported by the terminal apparatus 2A itself.

Furthermore, the radio resource control unit 2011 manages various configuration information of the terminal apparatuses 2A itself. Furthermore, the radio resource control unit 2011 generates information to be mapped to each uplink channel, and outputs the generated information to the transmission unit 203.

The radio resource control unit 2011 acquires configuration information of CSI feedback transmitted from the base station apparatus, and outputs the acquired information to the control unit 202.

The scheduling information interpretation unit 2012 interprets the downlink control information received through the reception unit 204, and determines scheduling information. The scheduling information interpretation unit 2012 generates the control information in order to control the reception unit 204 and the transmission unit 203 in accordance with the scheduling information, and outputs the generated information to the control unit 202.

On the basis of the information input from the higher layer processing unit 201, the control unit 202 generates a control signal for controlling the reception unit 204, the channel state information generating unit 205, and the transmission unit 203. The control unit 202 outputs the generated control signal to the reception unit 204, the channel state information generating unit 205, and the transmission unit 203 to control the reception unit 204 and the transmission unit 203.

The control unit 202 controls the transmission unit 203 to transmit CSI generated by the channel state information generating unit 205 to the base station apparatus.

In accordance with the control signal input from the control unit 202, the reception unit 204 demultiplexes, demodulates, and decodes a reception signal received from the base station apparatus 1A through the transmit and/or receive antenna 206, and outputs the resulting information to the higher layer processing unit 201.

The radio reception unit 2041 converts, by down-converting, a downlink signal received through the transmit and/or receive antenna 206 into a baseband signal, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal.

The radio reception unit 2041 removes a portion corresponding to CP from the digital signal resulting from the conversion, performs fast Fourier transform on the signal from which CP has been removed, and extracts a signal in the frequency domain.

The demultiplexing unit 2042 demultiplexes the extracted signal into PHICH, PDCCH, EPDCCH, PDSCH, and the downlink reference signal. Further, the demultiplexing unit 2042 makes a compensation of channels including PHICH, PDCCH, and EPDCCH based on a channel estimation value of the desired signal obtained from the channel measurement, detects the downlink control information, and outputs the information to the control unit 202. The control unit 202 outputs PDSCH and the channel estimation value of the desired signal to the signal detection unit 2043.

The signal detection unit 2043, using PDSCH and the channel estimation value, detects a signal, and outputs the detected signal to the higher layer processing unit 201.

The transmission unit 203 generates the uplink reference signal in accordance with the control signal input from the control unit 202, codes and modulates the uplink data (the transport block) input from the higher layer processing unit 201, multiplexes PUCCH, PUSCH, and the generated uplink reference signal, and transmits a result of the multiplexing to the base station apparatus 1A through the transmit and/or receive antenna 206.

The coding unit 2031 codes the uplink control information input from the higher layer processing unit 201 in compliance with a coding scheme, such as convolutional coding or block coding. Furthermore, the coding unit 2031 performs turbo coding in accordance with information used for the scheduling of PUSCH.

The modulation unit 2032 modulates coded bits input from the coding unit 2031, in compliance with the modulation scheme notified with the downlink control information, such as BPSK, QPSK, 16QAM, or 64QAM, or in compliance with a modulation scheme prescribed in advance for each channel.

The uplink reference signal generation unit 2033 generates a sequence acquired according to a rule (formula) prescribed in advance, based on a physical cell identity (PCI, also referred to as a cell ID or the like) for identifying the base station apparatus 1A, a bandwidth to which the uplink reference signal is mapped, a cyclic shift notified with the uplink grant, a parameter value for generation of a DMRS sequence, and the like.

In accordance with the control signal input from the control unit 202, the multiplexing unit 2034 rearranges modulation symbols of PUSCH in parallel and then performs Discrete Fourier Transform (DFT) on the rearranged modulation symbols. Furthermore, the multiplexing unit 2034 multiplexes PUCCH and PUSCH signals and the generated uplink reference signal for each transmit antenna port. To be more specific, the multiplexing unit 2034 maps the PUCCH and PUSCH signals and the generated uplink reference signal to the resource elements for each transmit antenna port.

The radio transmission unit 2035 performs Inverse Fast Fourier Transform (IFFT) on a signal resulting from the multiplexing, performs the modulation of SC-FDMA scheme, generates an SC-FDMA symbol, attaches CP to the generated SC-FDMA symbol, generates a baseband digital signal, converts the baseband digital signal into an analog signal, removes unnecessary frequency components, up-converts a result of the removal into a signal of a carrier frequency, performs power amplification, and outputs a final result to the transmit and/or receive antenna 206 for transmission.

The terminal apparatus 2 can perform a modulation of an OFDMA scheme, not limited to a SC-FDMA scheme.

The control unit 202 of the terminal apparatus 2 according to the present embodiment includes a function for controlling transmit power of an uplink signal generated by the transmission unit 203 to the base station apparatus 1. For example, the control unit 202 can calculate the transmit power $P_{PUSCH,\,c}(i)$ related to the transmission of the ith subframe to be transmitted to the cth cell based on the Equation (1).

Equation (1)

$$P_{PUSCH,c}(i) = \min \left\{ \begin{array}{l} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array} \right\} \quad (1)$$

$P_{CMAX,\,c}(i)$ is a term regarding the maximum allowable transmit power of the terminal apparatus 2 related to the transmission of the ith subframe to be transmitted to the cth cell. $M_{PUSCH,\,c}(i)$ represents the number of resource blocks allocated to the terminal apparatus 2 in the transmission of the ith subframe to be transmitted to the cth cell. That is, the term represented by $10 \log_{10}(M_{PUSCH,\,c}(i))$ is a term related to the radio resource amount allocated to the terminal apparatus 2. $P_{O\_PUSCH,\,c}(j)$ is a term related to the target received power in a case of transmission to the cth cell, and is a term related to the target received power in a case that the terminal apparatus 2 transmits the uplink signal to the base station apparatus 1 having the cth cell as well. Here, j is an integer, and $P_{O\_PUSCH,\,c}(j)$ can be a different value by changing j. $\alpha_c(j)$ is a term (coefficient) related to compensation of propagation loss between the base station apparatus 1 having the cth cell and the terminal apparatus 2. Here, j is an integer, and $\alpha_c(j)$ can be a different value by changing j. $PL_c$ is a term related to the propagation loss between the base station apparatus 1 having the cth cell and the terminal apparatus 2. $\Delta_{TF,\,c}(i)$ is a term related to the modulation scheme performed by the modulation unit 2032 with respect to the signal included in the ith subframe to be transmitted to the cth cell. $f_c(i)$ is a term related to the control error that occurs in a case that the control unit 202 controls the transmit power of the signal included in the ith subframe to be transmitted to the cth cell. The variable names of the respective terms of the Equation (1) are set for convenience of explanation, and the operation of the terminal apparatus 2 according to the present embodiment is not limited by the variable name, and the variable name can be changed to an arbitrary name.

The control unit 202 of the terminal apparatus 2 according to the present embodiment can control the transmit power based on the frame structure set by the multiplexing unit 2034 (transmission unit 203) (or the radio parameter that defines the frame structure, the base parameter that determines the parameter of the radio frame, or the parameter set). Specifically, at least one term of a plurality of terms included in the Equation (1) is associated with a frame structure set by the multiplexing unit 2034.

The control unit 202 according to the present embodiment can control the transmit power with the length of one subframe as a control unit as also shown in the Equation (1). The control unit 202 can control the transmit power not by the subframe length but by an arbitrary control unit such as slot length, OFDM symbol length, SC-FDMA symbol length, frame length. The control unit 202 according to the present embodiment can set a unit for controlling the transmit power based on the frame structure set by the multiplexing unit 2034. For example, the time interval (time granularity) in which the control unit 202 controls transmit power for the 100th frame structure having a wide subcarrier interval, can be set narrower than the 200th frame structure in which the subcarrier interval is narrower than the 100th frame structure. By controlling in this way, the control unit 202 can more flexibly control the transmit power of a signal having a frame structure with a short frame length (symbol length). Further, the control unit 202 according to the present embodiment can change the time unit for calculating a plurality of terms included in Equation (1) for each frame structure.

The control unit 202 according to the present embodiment can set the term related to the maximum allowable transmit power in Equation (1) for each frame structure. For example, the control unit 202 can set the maximum allowable transmit power in a frame structure required high reliability to be higher than another frame structure. By setting in this way, the uplink signal transmitted to the base station apparatus 1 in the frame structure having high maximum allowable transmit power can be received by the base station apparatus 1 with better reception quality, compared with the signal transmitted in another frame structure. In a case that high reliability is required (for example, in a case of a predetermined frame structure), the terminal apparatus 2 does not perform the transmit power control but can always transmit at the maximum allowable transmit power by the instruction or configuration from the base station apparatus 1.

The control unit 202 according to the present embodiment can set the term related to the radio resource amount allocated to the terminal apparatus 2 in Expression (1) for each frame structure. Further, the control unit 202 according to the present embodiment can set a term related to the radio resource amount using a common unit independent of the frame structure. For example, the control unit 202 according to the present embodiment can set a term related to the radio resource amount in units of RB-2 in which the frequency bandwidth per one unit is fixed. Since the bandwidth per one unit of RB-2 is uniquely fixed, in a case that subcarrier intervals are different among the parameters provided by the frame structure, the number of subcarriers included in RB-2 also differs. By using a common frequency unit, the control unit 202 can set a term related to the radio resource amount independent of the frame structure.

The control unit 202 according to the present embodiment can set the term related to the target received power in Equation (1) for each frame structure. For example, the control unit 202 can set the target received power set in a case of a predetermined frame structure, higher or lower than the target received power set in a case of a frame structure other than the predetermined frame structure. By setting the target received power set by the control unit 202 to a predetermined frame structure to be high, the reception quality of a signal having a predetermined frame structure can be improved. On the other hand, by setting the target received power set by the control unit 202 to a predetermined frame structure to be low, the interference power affected to a different cell or neighbor channel by a signal having a predetermined frame structure can be reduced.

The control unit 202 according to the present embodiment can further add a term related to the gain obtained by the beam forming performed by the base station apparatus 1 and the terminal apparatus 2, to the term related to the target received power in the Equation (1). For example, the control unit 202 can define $B_c(i)$ as a compensation coefficient for beam forming gain and set $B_c(i) \times P_{O\_PUSCH,\ c}(j)$ as a term related to the target received power. In a case that a predetermined frame structure is set, the control unit 202 can take into account the compensation coefficient related to the beam forming gain. The control unit 202 can determine the compensation coefficient for the beam forming gain depending on whether or not the transmit and receive antenna 206 of the terminal apparatus 2 or the transmit and receive antenna 105 of the base station apparatus 1 performs the beam forming. For example, the control unit 202 can sets $B_c(i)$ to 1 in a case that beamforming is not performed, and sets $B_c(i)$ to a real number that is greater than 0 and less than or equal to 1 in a case that beam forming is performed.

The control unit 202 can set the term related to the compensation of the propagation loss in Equation (1) for each frame structure. The control unit 202 can set a value included in a set of values that can be set in terms related to the compensation of the propagation loss for each frame structure.

The control unit 202 can set the term relating to the propagation loss in Expression (1) for each frame structure. For example, in a case that a predetermined frame structure is set, the control unit 202 can take into account the compensation coefficient related to the beamforming gain, in terms of the propagation loss. For example, in a case of being set to a predetermined frame structure, the control unit 202 can take into account the gain by the beam forming performed by the base station apparatus 1 and the terminal apparatus 2 to measure the propagation loss in a case of setting the propagation loss.

The control unit 202 can further add the term related to beam forming to Equation (1). As a term related to beam forming, the control unit 202 can set the gain obtained by the beam forming performed by the base station apparatus 1 and the terminal apparatus 2. In a case that a predetermined frame structure is set, the control unit 202 can set a value selected from a plurality of values in the term related to the beam forming. In a case that a frame structure other than the predetermined frame structure is set, the control unit 202 can set a predetermined value (for example, 0) to the term related to the beam forming. The control unit 202 can set the difference between the gain obtained by the beam forming performed by the base station apparatus 1 and the terminal apparatus 2, and the gain by the reference beam forming. As the gain by reference beam forming, the control unit 202 can use, for example, information related to the received gain of a signal including the common reference signal or the common control information transmitted from the base station apparatus 1. The control unit 202 can use the information related to the received gain of the signal including the unique reference signal or the data addressed to the terminal apparatus 2, as the information related to the gain obtained by beamforming.

In a case that the control unit 202 controls the transmit power of the uplink signal having the predetermined frame structure based on the Equation (1), the plurality of terms included in the Equation (1) are calculated using the set value for the predetermined frame structure. However, the control unit 202 can also set any one or more of the plurality of terms in Equation (1) to a common value regardless of the set frame structure difference. For example, in the propagation loss, the propagation loss calculated in a certain frame structure can be used as the propagation loss in another frame structure.

In a case that the control unit 202 controls the transmit power of the uplink signal having the predetermined frame structure based on the Equation (1), and further in a case that the terminal apparatus 2 uses a plurality of component carriers at the same time (by carrier aggregation) to transmit the uplink signal, the control unit 202 can calculate the transmit power for each component carrier to control the transmit power based on the summed value. At this time, in a case of adding up the transmit power for each of the component carriers, the control unit 202 can add up with weighting for each of the component carriers, instead of simply adding up them. The control unit 202 can determine a coefficient of weighting to be performed for each component carrier based on the frame structure set in the component carrier. It goes without saying that the control unit 202 according to the present embodiment can also control the transmit power in a case of performing carrier aggregation of a plurality of component carriers in which different frame structure are set.

In a case that the control unit 202 controls the transmit power of the uplink signal having the predetermined frame structure based on Equation (1), and further in a case that the terminal unit 2 transmits at least part of the data signal and the control signal as the uplink signal at the same time in different frequency resources, the control unit 202 can subtract the transmit power required for transmission of the control signal from the term related to the maximum allowable transmit power in Equation (1). By controlling in this way, the terminal apparatus 2 can avoid the problem where the control signal cannot be transmitted. The transmit power required for transmission of the control signal to be subtracted from the term related to the maximum allowable transmit power in the Equation (1) by the control unit 202 according to the present embodiment, can be set based on the frame structure set to the signal including the control signal.

The reception unit 204 (the higher layer processing unit 201) of the terminal apparatus 2 can obtain the control information related to at least one item of a plurality of terms included in the Equation (1) from the base station apparatus 1. The terminal apparatus 2 can obtain the control information from the broadcast information (for example, Master Information Block (MIB) notified through a Broadcast CHannel (BCH) or information included in System Information Block (SIB)) of the base station apparatus 1. The terminal apparatus 2 can obtain the control information from control information of the physical layer (for example, DCI notified through the PDCCH) transmitted by the base station apparatus 1.

The cycle at which the terminal apparatus 2 acquires the control information from the base station apparatus 1 may be different for each frame structure to be set.

The control information related to at least one of the plurality of terms included in the Equation (1) obtained by the terminal apparatus 2 may be associated with a predetermined frame structure among a plurality of frame structures. The control unit 202 can set at least one of a plurality of terms associated with the frame structure other than the predetermined frame structure and included in the Equation (1), based on the obtained control information associated with the predetermined frame structure.

The base station apparatus 1 can notify the terminal apparatus 2 of control information on at least one item of a plurality of terms included in the Equation (1) used in a case that the terminal apparatus 2 controls the transmit power. The control information and the notification method notified to the terminal apparatus 2 by the base station apparatus 1 can be determined based on the frame structure set by the base station apparatus 1. The base station apparatus 1 can broadcast the control information associated with a predetermined frame structure by including in the broadcast information (for example, information included in Master Information Block (MIB) or System Information Block (SIB) broadcast through a Broadcast CHannel (BCH)). The base station apparatus 1 can transmit the control information associated with a predetermined frame structure by including in the physical layer control information (for example, DCI notified through the PDCCH or a signal including a TPC command). The cycle at which the base station apparatus 1 broadcasts or transmits a signal including the control information may be different for each frame structure to be set. The base station apparatus 1 can be set so as not to simultaneously transmit the control information associated with different frame structure. Also, the base station apparatus 1 can be set so that the control information associated with a predetermined frame structure can be notified to the terminal apparatus 2 using only a signal having the predetermined frame structure.

In a case of controlling the transmit power, the control unit 202 according to the present embodiment can set the transmit power per subcarrier to a different value for each frame structure. For example, the transmit power per subcarrier in a frame structure with subcarrier interval of 15 kHz can be set to ½ of the transmit power per subcarrier in a frame structure with subcarrier interval of 30 kHz. By thus controlling the transmit power by the control unit 202, the transmit power per unit frequency (for example, the transmit power per 1 MHz, or the transmit power spectrum density) of the uplink signal transmitted by the terminal apparatus 2 can be made constant regardless of the frame structure. By controlling in this way, for example, the flatness (flatness, smoothness) of the signal spectrum of the signal transmitted by the terminal apparatus 2 can be improved.

The terminal apparatus 2 according to the present embodiment can notify the base station apparatus 1 of information on the transmit power configuration capability of the apparatus itself. The information as to the configuration ability may be a Power Headroom (PH). The control unit 202 of the terminal apparatus 2 according to the present embodiment can calculate the power headroom $PH_{type1,c}(i)$ related to the transmission of the ith subframe for transmitting to the cth cell based on, for example, Equation (2).

Equation (2)

$$P_{PUSCH,c}(i) = P_{CMAX,c}(i) - \{10 \log_{10}(M_{PUSCH,c}(i)) + P_{O\_PUSH,c}(j) + \alpha_c(j) \cdot PL_c + \Delta_{TF,c}(i) + f_c(i)\} \quad (2)$$

As shown in the Equation (2), PH is expressed as the difference between the maximum allowable transmit power of the terminal apparatus 2 and the transmit power of the terminal apparatus 2 being requested by the base station apparatus 1. In a case that PH is a positive value, it means that the terminal apparatus 2 still has a margin of the transmit power (the terminal apparatus 2 can transmit a signal with a higher transmit power than the current transmit power). In a case that PH is 0, it means that the terminal apparatus 2 has no margin of the transmit power (the terminal apparatus 2 cannot transmit a signal with a higher transmit power). In a case that PH is a negative value, it means that the terminal apparatus 2 cannot transmit a signal with the transmit power requested by the base station apparatus 1. By notifying the PH to the base station apparatus 1 by the terminal apparatus 2, the base station apparatus 1 can know the amount of radio resources to be allocated to the terminal apparatus 2. In a case that the terminal apparatus 2 reports PH to the base station apparatus 1 without resources being allocated, the terminal apparatus 2 can calculate the PH without considering the radio resource amount. Further, in a case that resources are allocated but transmission is failed for some reason, the terminal apparatus 2 can calculate the PH while considering the allocated resources.

The terminal apparatus 2 according to the present embodiment can notify the base station apparatus 1 of PH for each frame structure. The cycle at which the terminal apparatus 2 notifies PH to the base station apparatus 1 may be different for each frame structure. The terminal apparatus 2 can notify the base station apparatus 1 of only the PH relating to the frame structure requested by the base station apparatus 1.

Further, the base station apparatus 1 and the terminal apparatus 2 can agree in advance a predetermined frame structure for calculating the PH. In this case, the base station apparatus 1 can calculate the PH associated with the frame structure other than the predetermined frame structure, using the PH associated with the predetermined frame structure notified from the terminal apparatus 2.

In the Equation (2), the term subtracted from the maximum allowable transmit power includes all of the terms included in the Equation (1) used by the control unit 202 for calculating the transmit power. In a case of calculating the PH, the control unit 202 according to the present embodiment may not necessarily include all of the plurality of terms included in the Equation (1) in the term subtracted from the maximum allowable transmit power. The term included in the term that the control unit 202 subtracted from the maximum allowable transmit power may be a different combination to be set for each frame structure or may be common among the frame structure.

In the predetermined frame structure, the terminal apparatus 2 according to the present embodiment can always transmit the uplink signal at the maximum allowable transmit power of the terminal apparatus 2. In this case, since the PH is always 0 as long as a predetermined frame structure is set, the terminal apparatus 2 does not need to notify PH to the base station apparatus 1. That is, the terminal apparatus 2 according to the present embodiment can be set so as not to transmit PH by setting a predetermined frame structure.

A program running on an apparatus according to the present invention may serve as a program that controls a Central Processing Unit (CPU) and the like to cause a computer to operate in such a manner as to realize the functions of the embodiment according to the present invention. Programs or the information handled by the programs are temporarily stored into a volatile memory, such as a Random Access Memory (RAM), or stored in a non-volatile memory, such as a flash memory or a Hard Disk Drive (HDD), or another storage system.

A program for realizing the functions of the embodiments according to the present invention may be recorded in a computer readable recording medium. It may be realized by causing a computer system to read the program recorded on this recording medium for execution. It is assumed that the "computer system" refers to a computer system built into the apparatuses, and the computer system includes an operating system and hardware components such as a peripheral device. Further, the "computer-readable recording medium" may refer to a semiconductor recording medium, an optical recording medium, a magnetic recording medium, a medium that dynamically holds a program for a short period of time, or another recording medium that can be read by a computer.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or may be a processor of known type, a controller, a micro-controller, or a state machine. The above-described electric circuit may be configured by a digital circuit or may be configured by an analog circuit. Furthermore, in a case that with advances in semiconductor technology, a circuit integration technology appears that replaces the present integrated circuits, one or more embodiments of the present invention can use a new integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

The present invention can be preferably used in a base station apparatus, a terminal apparatus, and a communication method.

The present international application claims priority based on JP 2016-133247 filed on Jul. 5, 2016, and all the contents of JP 2016-133247 are incorporated in the present international application by reference.

REFERENCE SIGNS LIST

1A Base station apparatus
2A, 2B Terminal apparatus
101 Higher layer processing unit
102 Control unit
103 Transmission unit
104 Reception unit
105 Transmit and/or receive antenna
1011 Radio resource control unit
1012 Scheduling unit
1031 Coding unit
1032 Modulation unit
1033 Downlink reference signal generation unit
1034 Multiplexing unit
1035 Radio transmission unit
1041 Radio reception unit
1042 Demultiplexing unit
1043 Demodulation unit
1044 Decoding unit
201 Higher layer processing unit
202 Control unit
203 Transmission unit
204 Reception unit
205 Channel state information generating unit
206 Transmit and/or receive antenna
2011 Radio resource control unit
2012 Scheduling information interpretation unit
2031 Coding unit
2032 Modulation unit
2033 Uplink reference signal generation unit
2034 Multiplexing unit
2035 Radio transmission unit
2041 Radio reception unit
2042 Demultiplexing unit
2043 Signal detection unit

The invention claimed is:

1. A terminal apparatus for communicating with at least one base station apparatus, comprising:
reception circuitry configured to receive information indicating a plurality of numerologies out of a predetermined set of numerologies from the at least one base station apparatus;
control circuitry configured to perform transmit power control using a value set corresponding to one of the plurality of numerologies relating to at least one of a maximum allowable transmit power, an allocated radio resource amount, a target received power, a propagation loss estimate performed by the terminal apparatus, a coefficient for compensation of the propagation loss estimate, a modulation scheme, and an error in the transmit power control; and
transmission circuitry configured to generate a transmit signal based on the one of the plurality of numerologies and the transmit power control and transmit the transmit signal in a serving cell corresponding to one of the at least one base station apparatus,
wherein a radio resource amount allocated to the terminal apparatus is set based on a predetermined radio resource unit.

2. The terminal apparatus according to claim 1, wherein a target received power in the at least one base station apparatus includes a transmit power control related to an antenna gain of the at least one base station apparatus and the terminal apparatus, and
the transmit power control related to the antenna gain is set based on a reference antenna gain and an antenna gain of the at least one base station apparatus and the terminal apparatus.

3. The terminal apparatus according to claim 1, wherein the coefficient related to compensation for the propagation loss is capable of being set to a value exceeding 1 in a case that a predetermined numerology is set out of the plurality of numerologies.

4. The terminal apparatus according to claim 1, wherein
the propagation loss between the at least one base station apparatus and the terminal apparatus includes a transmit power control related to an antenna gain of the base station apparatus and the terminal apparatus, and
the transmit power control related to the antenna gain is set based on a reference antenna gain and an antenna gain of the base station apparatus and the terminal apparatus.

5. The terminal apparatus according to claim 1, wherein
the control circuitry is configured to further perform a transmit power control related to an antenna gain of the at least one base station apparatus and the terminal apparatus, and
the transmit power control related to the antenna gain is set based on a reference antenna gain and an antenna gain of the at least one base station apparatus and the terminal apparatus.

6. The terminal apparatus according to claim 1, wherein the control circuitry is configured to perform a transmit power control using a value set for a numerology in a case of the predetermined numerology.

7. The terminal apparatus according to claim 1, wherein the control circuitry is configured to calculate a transmit power based on at least control information notified from the at least one base station apparatus, and a configuration cycle of the control information is set for each of the plurality of numerologies.

8. The terminal apparatus according to claim 1, wherein information indicating a difference between the maximum allowable transmit power and the transmit power of the transmit signal is notified to the at least one base station apparatus.

9. The terminal apparatus according to claim 8, wherein a cycle of notifying the information indicating the difference to the the at least one base station apparatus is set for each of the plurality of numerologies.

10. A base station apparatus for communicating with a terminal apparatus,
the base station apparatus comprising transmission circuitry configured notify an instruction related to at least one of a plurality of numerologies and control information related to transmit power control of the terminal apparatus in a serving cell with transmit power parameter sets corresponding to different numerologies, wherein
the control information includes at least one of a maximum allowable transmit power of the terminal apparatus, an allocated radio resource amount to the terminal apparatus, a target received power in the base station apparatus of the terminal apparatus, a propagation loss estimate performed by the terminal apparatus, a coefficient for compensation of the propagation loss estimate, a modulation scheme of the terminal apparatus, and an error of the terminal apparatus in the transmit power control,
the at least one information included in the control information is set for each of the plurality of numerologies, and
the cycle in which the transmission circuitry is configured to notify the control information is determined based on the one of the plural number of numerologies associated with at least part of the information included in the control information.

11. A communication method of a terminal apparatus for communicating with a base station apparatus, comprising:
receiving information indicating a plurality of numerologies;
performing transmit power control using a value set corresponding to one of the plurality of numerologies relating to at least one of a maximum allowable transmit power, an allocated radio resource amount, a target received power in the base station apparatus, a propagation loss estimate performed by the terminal apparatus, a coefficient for compensation of the propagation loss estimate, a modulation scheme, and an error in the transmit power control;
generating a transmit signal based on the one of the plurality of numerologies and the transmit power control and transmitting the transmit signal in a serving cell with transmit power parameter sets corresponding to different numerologies,
wherein a radio resource amount allocated to the terminal apparatus is set based on a predetermined radio resource unit.

12. The terminal apparatus of claim 1, wherein a numerology of the plurality of numerologies is related to at least one of subcarrier spacing, symbol duration, and cyclic prefix length.

13. The terminal apparatus of claim 1, wherein each of the plurality of numerologies corresponds to a different set of radio resource units.

14. The terminal apparatus of claim 1, wherein each of the plurality of numerologies corresponds to a different serving cell.

15. The terminal apparatus of claim 1, further comprising:
performing another transmit power control using another value set corresponding to another one of the plurality of numerologies;
generating another transmit signal based on the another one of the plurality of numerologies and the another transmit power control, and transmit the another transmit signal.

16. The terminal apparatus of claim 15, wherein the another transmit signal is transmitted in another service cell corresponding to the another one of the plural number of numerologies.

17. The terminal apparatus of claim 1, wherein the plurality of numerologies is configured for the serving cell, and individual value sets for the transmit power control are configured for each of the plurality of numerologies.

* * * * *